United States Patent
Gotou et al.

(10) Patent No.: US 8,418,566 B2
(45) Date of Patent: Apr. 16, 2013

(54) MULTI-LAYERED FLOW PASSAGE MEMBER AND ULTRASONIC WAVE FLUID MEASURING DEVICE

(75) Inventors: Hirokazu Gotou, Nara (JP); Takehiko Shigeoka, Nara (JP)

(73) Assignee: Panasonic Corporation, Osaka (JP)

( * ) Notice: Subject to any disclaimer, the term of this patent is extended or adjusted under 35 U.S.C. 154(b) by 227 days.

(21) Appl. No.: 13/062,862

(22) PCT Filed: Nov. 5, 2009

(86) PCT No.: PCT/JP2009/005889
§ 371 (c)(1),
(2), (4) Date: Mar. 8, 2011

(87) PCT Pub. No.: WO2010/052912
PCT Pub. Date: May 14, 2010

(65) Prior Publication Data
US 2011/0167926 A1    Jul. 14, 2011

(30) Foreign Application Priority Data

Nov. 5, 2008 (JP) ................ P2008-283845
Nov. 5, 2008 (JP) ................ P2008-283846
Nov. 12, 2008 (JP) ................ P2008-289540

(51) Int. Cl.
*G01F 1/20* (2006.01)
(52) U.S. Cl.
USPC ........................................... 73/861.18
(58) Field of Classification Search ........... 73/861.18, 73/861.25, 861.27
See application file for complete search history.

(56) References Cited

U.S. PATENT DOCUMENTS
7,237,441 B2   7/2007   Umekage et al.
7,980,142 B2 * 7/2011   Nakabayashi et al. ..... 73/861.27
8,161,824 B2 * 4/2012   Satou et al. ................ 73/861.27
(Continued)

FOREIGN PATENT DOCUMENTS
JP   2003-269417 A   9/2003
JP   2004-316685 A   11/2004
(Continued)

OTHER PUBLICATIONS
International Search Report for International Application No. PCT/JP2009/005889, dated Jan. 26, 2010, 2 pages.

*Primary Examiner* — Jewel V Thompson
(74) *Attorney, Agent, or Firm* — Brinks Hofer Gilson & Lione

(57) ABSTRACT

An objective of the invention is to provide a multilayered flow passage member that enhances fluid measurement accuracy of an ultrasonic fluid measurement apparatus and an ultrasonic fluid measurement apparatus using the multilayered flow passage member. When fusible projections 20 are fused by a heating head 21 while partition plates 11 are inserted into side plates 13 and 14, a fused state provided by the heating head 21 changes according to either side of each of the partition plates 11, because fuse surfaces at leading ends of the respective fusible projections 20 are sloped in the vertical direction. An outermost end of each of fusible projections 25 that first contacts the heating head 21 is first fused. During a course of the fusible projections 25 being fused toward their roots, the partition plates 11 are pressed against ends of respective insert holes 17a that are on the opposite side of the outermost ends that are first fused. As a result, the partition plates 11 become one-sided with respect to the respective insert holes 17a and fixed by means of positional accuracy of the insert holes 17a. Even when clearance exists between the partition plates 11 and the insert holes 17a, the partition plates can be fused with superior accuracy.

13 Claims, 24 Drawing Sheets

U.S. PATENT DOCUMENTS

| | | |
|---|---|---|
| 2007/0193367 A1 | 8/2007 | Umekage et al. |
| 2011/0167926 A1 | 7/2011 | Gotou et al. |

FOREIGN PATENT DOCUMENTS

| | | |
|---|---|---|
| JP | 2006-017499 A | 1/2006 |
| JP | 2006-029907 A | 2/2006 |
| JP | 2006-038627 A | 2/2006 |
| JP | 2008-107234 A | 5/2008 |
| JP | 2009-210525 A | 9/2009 |
| JP | 2010-112774 A | 5/2010 |
| WO | WO 2004/074783 A1 | 9/2004 |

\* cited by examiner (A)

(B)

(A)

(B)

(A)

(B)

(A)

(B)

(C)

MULTI-LAYERED FLOW PASSAGE MEMBER AND ULTRASONIC WAVE FLUID MEASURING DEVICE

This application is a 371 application of PCT/JP2009/005889 having an international filing date of Nov. 5, 2009, which claims priority to JP2008-283845 filed on Nov. 5, 2008, JP2008-283846 filed on Nov. 5, 2008 and JP2008-289540 filed on Nov. 12, 2008, the entire contents of which are incorporated herein by reference.

TECHNICAL FIELD

The present invention relates to a multilayered flow passage member having a measurement flow passage made up of a plurality of flat flow passages as well as to an ultrasonic fluid measurement apparatus using the multilayered flow passage member.

BACKGROUND ART

The ultrasonic fluid measurement apparatus is for letting fluid flow through measurement flow passages, letting an ultrasonic wave propagate through an interior of the measurement flow passage, measuring an ultrasonic wave propagation time, and determining a fluid flow rate from resultant measurement information.

The measurement flow passage assumes a rectangular shape that is oblong in cross section. A pair of ultrasonic transceivers are provided in neighborhoods of respective mutually-opposing short sides of the flow passage.

The pair of ultrasonic transceivers are arranged in such a way that an ultrasonic wave propagation path is formed at a predetermined angle with respect to a flowing direction of the measurement flow passage; namely, that the ultrasonic wave propagation path obliquely crosses a flow of fluid.

An ultrasonic fluid measurement apparatus recently proposed for enhancing accuracy of measurement includes a plurality of diaphragms placed in parallel within a measurement flow passage, to thus implement the measurement flow passage as a multilayered flow passage.

FIG. 23 shows a related art multilayered flow passage member of this type, and a flow passage unit 101 is partitioned by straightening plates 102, to thus create a plurality of small flow passages 103.

The plurality of straightening plates 102 and a support 104 that supports the straightening plates 102 are integrally formed by use of a thermosetting resin.

Specifically, the support 104 is molded while the plurality of straightening plates 102 remain inserted.

Since the straightening plates 102 and the support 104 supporting the straightening plates are integrally formed, the molding operation obviates a necessity for operation of inserting the straightening plates 102 one by one into the support 104.

Since the straightening plates and the support are integrally formed by use of the thermosetting resin, contraction which will occur during hardening of the resin can be lessened when compared with a case where they are integrally formed by use of a thermoplastic resin.

As shown in FIG. 24, another example multilayered flow passage member appears to have a measurement duct member 111 in which each of grooves 112 is made up of an opening 113 and a housing portion 114.

The housing portion 114 is formed at a depthwise end of the groove 112, and a size of the opening 113 is set so as to become greater than a thickness of a straightening plate 115.

The straightening plate 115 is inserted into the groove 112 through the opening 113. Since a height of the housing portion 114 is equal to the thickness of the straightening plate 115, the housed straightening plate 115 comes into contact with an interior wall surface of the housing portion 114, to thus be supported by the interior wall surface.

An area of the groove 112 extending from the opening 113 to the housing portion 114 (hereinafter called a "guide area") is formed in a shape such that a size of opening of the area becomes gradually smaller. Specifically, a slope 116 is formed in the guide area from the opening 113 to the housing portion 114.

Therefore, upon contact with the guide area during insertion, the straightening plate 115 is guided toward the depthwise end of the groove 112 along the slope 116.

The straightening plate 115 guided toward the depthwise end is housed into the housing portion 114 located at the depthwise end, as mentioned above.

Since the straightening plate 115 is guided into the housing portion 114 by the guide area, it is possible to continually perform insertion of the straightening plate 115 even when a tilt (or a misalignment) exists between the straightening plate 115 and the housing portion 114 within a range of the size of the opening 113 during inserting operation.

Thus, the degree of freedom of positional relationship between the straightening plate 115 and the housing portion 114 achieved during insertion is increased, which in turn facilitates fitting of the straightening plate 115.

Since the housing portion 114 supports, in a contacting fashion, the straightening plate 115 in a housed state, occurrence of a rattle in the straightening plate 115 can be prevented, or the rattle can be lessened (see; for instance, Patent Documents 1 through 3).

RELATED ART DOCUMENTS

Patent Documents

Patent Document 1: Brochure of International Patent Publication No. 2004/074783
Patent Document 2: JP-A-2004-316685
Patent Document 3: JP-A-2006-029907

DISCLOSURE OF THE INVENTION

Problem that the Invention is to Solve

However, when the measurement flow passage is changed into a multilayered flow passage, a problem of deterioration of measurement accuracy is raised by a positional relationship between a pair of ultrasonic transceivers disposed in the measurement flow passage and the multilayered flow passage and also by dimensional variations between straightening plates when both edges of the straightening plates used for forming a multilayered flow passage are supported by frames. A high precision multilayered flow passage member has been sought to perform highly accurate measurement.

In the former example using the measurement flow passage as the multilayered flow passage, a plurality of straightening plates and supports that support the straightening plates are integrally formed by insert molding and through use of a thermosetting resin. Hardening of the resin involves consumption of much time. Further, a very long time elapses from when a resin is poured into a molding die until when the resin is cooled and when a molded flow passage is taken out of the molding die. This raises drawbacks of poor productivity and a corresponding cost increase.

When a thermoplastic resin is used for this reason without use of the thermosetting resin, great contraction occurs, which raises another problem of poor dimensional accuracy. In the latter example, the groove is made up of an opening that is greater than the thickness of the straightening plate and the housing portion that is equal in size to the thickness of the straightening plate. The housing portion is formed at a leading end located deeper than is the opening in a depthwise direction of the groove, and the straightening plate is guided to the guide area of the opening and subsequently guided to the housing portion. In order to retain the straightening plate with superior dimensional accuracy, the housing portion that houses the straightening plate needs strength because moment is exerted on the housing portion. Further, a sufficient depth of the housing portion must also be assured.

However, when a resin is used for the measurement duct including the housing portions from the viewpoint of moldability, the thickness of the measurement duct must be increased in order to assume retaining strength. However, an increase in thickness leads to occurrence of a trade-off problem; namely, deterioration of dimensional accuracy, for reasons of contraction, a molding sink, and the like. For this reason, it becomes necessary to achieve a balance among strength, accuracy, and operability like ease of insertion, thereby eventually raising a drawback of a failure to pursuit a high degree of accuracy.

The present invention has been conceived to solve the related art problems and aims at providing a high precision multilayered flow passage member and an ultrasonic fluid measurement apparatus using the multilayered flow passage member.

SUMMARY OF THE INVENTION

Means for Solving the Problem

A first invention is directed toward a multilayered flow passage member including partition plates that are placed in an angular-sleeve-shaped measurement flow passage formed in an ultrasonic fluid measurement apparatus and that partition the measurement flow passage into a plurality of flat flow passages; side plates that cross the partition plates at a right angle and that support both edges of the respective partition plates; and upper and lower plates that are placed in parallel top and bottom the partition plates and that are coupled with the side plates, to thus support both edges, the flow passage member comprising:
  a lopsided fuse part including
    insert holes through which portions of the partition plates are to be inserted into the side plates; and
    fusible projections provided above and below the respective insert holes, wherein
  the fusible projections are fused by a fusing device while the partition plates are inserted into the respective side plates, thereby fixing the partition plates to the side plates, and wherein
  a fused state produced by the fusing device is caused to change according to either side of each of the partition plates, in such a way that clearance between the insert holes and the respective partition plates is formed in a given direction.

A second invention is based on the first invention, wherein the a lopsided fuse part is arranged so as to form clearance between the insert holes and the respective partition plates in a given direction, by sloping in the vertical direction a fuse surface at a leading end of each of the fusible projections provided above and below the respective insert holes through which the portions of the partition plates are to be inserted into the respective side plates, in such a way that a fused state changes according to either side of each of the partition plates when the fusible projections are fused by the fusing device.

When fusible projections are fused by a fusing device while the partition plates are inserted into the side plates, a fused state provided by the fusing device changes according to either side of each of the partition plates, because fuse surfaces at leading ends of the respective fusible projections are sloped in the vertical direction. An outermost end of each of the fusible projections that first contacts the fusing device is first fused. During a course of the fusible projections being fused toward their roots, clearance between the insert holes and the partition plates is progressively filled from neighborhoods of the outermost ends that are first fused.

Therefore, the partition plates are pressed against ends of the respective insert holes that are on the opposite side of the outermost ends that are first fused. As a result, the partition plates are positioned on one side with respect to the respective insert holes and fixed by means of positional accuracy of the insert holes. Even when clearance exists between the partition plates and the insert holes, the partition plates can be fused with superior accuracy. As a consequence, the interval between the partition plates can be held by means of positional accuracy of the insert holes. Hence, a highly accurate multilayered flow passage member can be formed in a simple configuration while operability, like ease of insertion, is maintained without involvement of an increase in strength of the side plates to which the partition plates are attached and without use of another member for assuring dimensional accuracy.

A third invention is based particularly on the first invention, wherein there is formed clearance between the insert holes and the respective partition plates in a given direction, by changing the shape or number of the fusible projections provided above and below the respective insert holes into which the portions of the partition plates are to be inserted, in such a way that the fusible projections provided above and below the respective insert holes through which the portions of the partition plates are to be inserted into the side plates become fused in different quantity according to either side of each of the partition plates.

The a lopsided fuse part is arranged in such a way that the fusible projections provided above and below the respective insert holes through which the portions of the partition plates are to be inserted into the side plates become fused in different quantity according to either side of each of the partition plates, by changing the shape or number of the fusible projections provided above and below the respective insert holes into which the portions of the partition plates are to be inserted. For this reason, the fused state provided by the fusing device changes according to either side of each of the partition plates. The fused portions of the fusible projections sequentially flow from a position where the fusible projections are fused in large quantity to another position where the fusible projections are fused in smaller quantity, to thus be smoothed. Consequently, the clearance between the insert holes and each of the partition plates is progressively filled from a neighborhood of the position where the fusible projections are fused in large quantity.

Therefore, the partition plates are pressed against ends of the respective insert holes opposite to their ends where the fusible projections are fused in large quantity, to thus become one-sided with respect to the respective insert holes. Further, the partition plates are fixed by means of positional accuracy of the slits of the insert holes. Even when clearance exists between the respective partition plates and the respective insert holes, they can be fixed with superior accuracy by fusing. As a consequence, the interval between the partition plates can be held by means of positional accuracy of the insert hole. Hence, a highly accurate multilayered flow passage member can be formed in a simple configuration while operability, like ease of insertion, is maintained without involvement of an increase in strength of the side plates to which the partition plates are attached and without use of another member for assuring dimensional accuracy.

A fourth invention is directed toward a multilayered flow passage member comprising:

partition plates that create partitions for a plurality of flat flow passages;

side plates that cross the respective partition plates at a right angle and that support both ends of the respective partition plates;

a top plate and a bottom plate that are disposed in parallel top and bottom the partition plates and that are coupled with the respective side plates, to thus support both edges;

support portions that are to be supported by the side plates and that are formed in portions of both edges of the respective partition plates; and insert holes through which the support portions are to be inserted into the side plates, wherein each of the insert holes includes an insert portion that assumes a shape of an aperture and that is greater than the support portion so as to facilitate insertion of the support portion and a stationary portion that is provided adjacently to the insert portion within a plane orthogonal to a direction into which the support portion is inserted into the insert portion, that has a part substantially identical in shape with a cross sectional profile of the support portion, and that makes the support portion stationary.

Consequently, after having been inserted into the insert portions of the insert holes of the respective side plates, the support portions of the partition plates are slid to the stationary portions situated on the lateral side of the respective insert portions. The partition plates thereby become fixed to the side plates, so that the partition plates are retained by means of positional accuracy of the stationary portions of the insert holes. Specifically, ease of insertion of the support portions of the partition plates is assured by the insert portions of the insert holes opened in the side plates. Further, highly accurate fixing of the support portions can be assured as a result of the support portions being slid to the stationary portions.

A fifth invention is based on the fourth invention, wherein the insert portion is set to space that is greater than a width and thickness of the support portion, and the stationary portion is set to space that is substantially identical with the thickness of the support portion.

A sixth invention is based on the fourth invention, wherein the stationary portion is formed at either an upper or lower position in each of the insert portions.

Consequently, after having been inserted into the insert portions of the insert holes of the respective side plates, the support portions of the partition plates are slid to the stationary portions situated on either side of the respective insert portions in their vertical direction. The partition plates thereby become fixed to the side plates, so that the partition plates are retained by means of positional accuracy of the stationary portions of the insert holes.

A seventh invention is based on the fourth to sixth inventions, wherein closure means closes clearance that develops in the respective insert portions in a state where the partition plates are fixed in the respective side plates as a result of the support portions being slid to the respective stationary portions after having been inserted into the respective insert portions.

As mentioned above, opening developing as a result of the partition plates being fixed to the side plates can be closed by the closure device. Further, the support portions of the partition plates slid to the stationary portions cannot return to the insert portions of the insert holes, thereby obviating a worry about return and removal of the support portions to and from the insert portions.

An eighth invention is based on the seventh invention, wherein the closure device are formed integrally on either the top plate or the bottom plate or on both of them.

Consequently, it becomes possible to fix the partition plates to the side plates and fix the side plates to either the top plate or the bottom plate or simultaneously to both the top plate and the bottom plate. Therefore, a multilayered flow passage member can be assembled in a simple configuration.

A ninth invention is directed toward a multilayered flow passage member comprising:

partition plates that partition a measurement flow passage into a plurality of flat flow passages;

side plates that cross the respective partition plates at a right angle and that support both ends of the respective partition plates;

a top plate and a bottom plate that are disposed in parallel, top and bottom the partition plates;

insert holes provided in the side plates to permit insertion of portions of the partition plates; and fusible projections positioned above and below the respective insert holes, wherein the partition plates are fused to the respective side plates by fusing the fusible projections while the portions of the partition plates remain inserted into the respective insert holes.

An interval between the partition plates can thereby be retained with high accuracy, and operability can also be enhanced.

A tenth invention is based on the ninth invention, wherein fuse portions used for fusing the partition plates to the respective side plates are provided at three positions of the side plate in its longitudinal direction; namely, a center and both ends, and wherein the center is first fused, and both ends are subsequently fused.

Consequently, the side plates assume a narrow, elongated shape and cannot help suffering warpage because of its structure. Even when the side plates assume a shape that is liable to warpage, the partition plates can be fused while warpage, or the like, in the side plates is limited.

An eleventh invention is directed toward an ultrasonic fluid measurement apparatus using the multilayered flow passage member described in any one of the first through tenth inventions.

Advantage of the Invention

According to the present invention, even when clearance exists between the partition plates and the insert holes, the partition plates can be one-sided with respect to the insert holes, whereby the interval between the partition plates can be held by means of positional accuracy of the insert holes. Hence, a highly accurate multilayered flow passage member can be formed in a simple configuration while operability, like ease of insertion, is maintained without involvement of an increase in strength of the side plates to which the partition plates are attached and without use of another member for assuring dimensional accuracy. It becomes possible to provide a highly accurate multilayered flow passage member that enhances fluid measurement accuracy and provide an ultrasonic fluid measurement apparatus using the multilayered flow passage member.

DETAILED DESCRIPTION OF THE PREFERRED EMBODIMENTS

Figure 1:
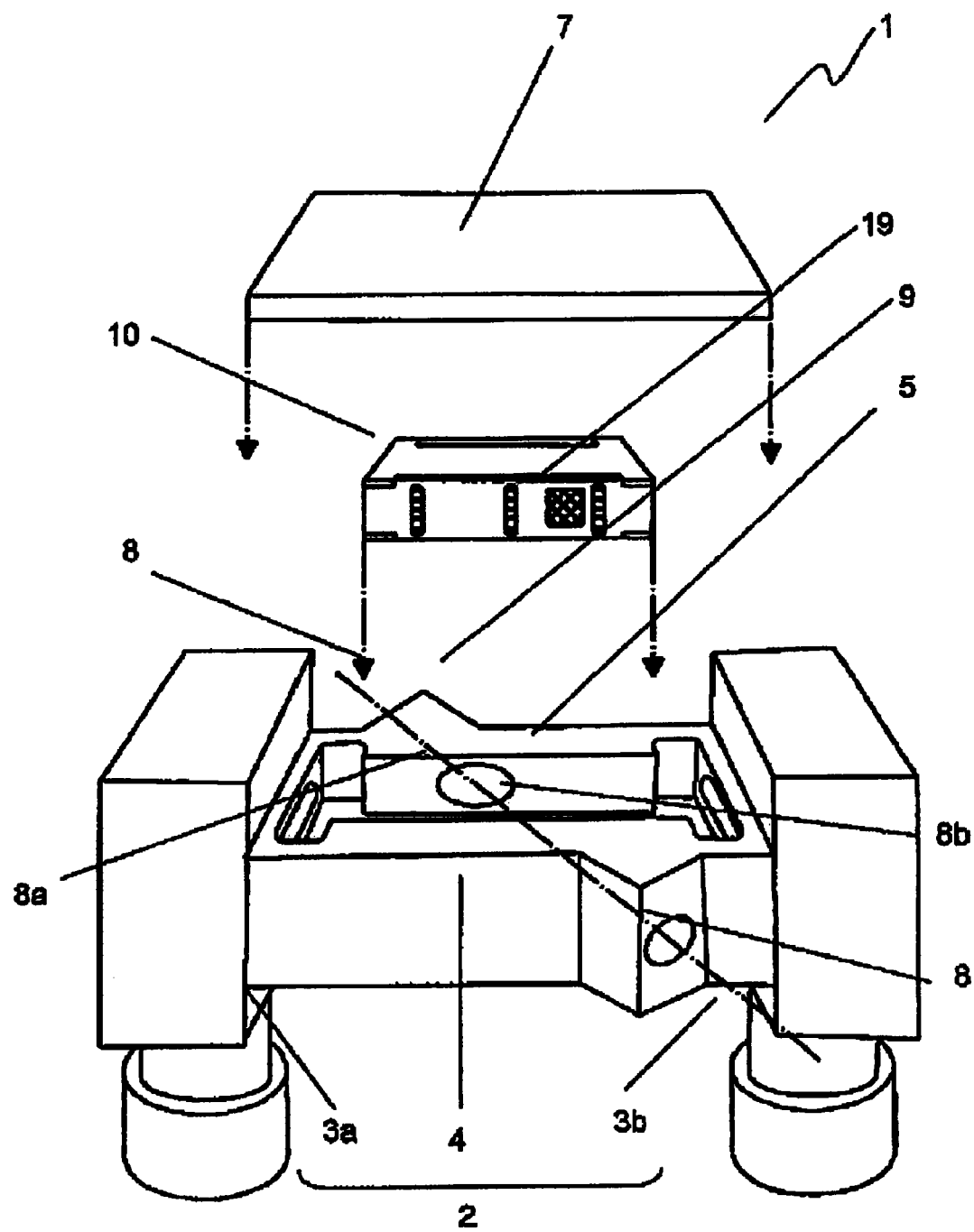
FIG. 1 is an exploded perspective view of an entire ultrasonic fluid measurement apparatus of a first embodiment of the present invention.

Embodiments of the present invention are now described hereunder by reference to the drawings. The present invention, however, shall not be confined to the embodiments.

First Embodiment

In FIGS. 1 through 4, a fluid passage 2 of an ultrasonic fluid measurement apparatus 1 is formed into the shape of a substantially reversed letter U and from a left vertical flow passage 3a, a right vertical flow passage 3b, and a horizontal flow passage 4 that connects an upper end of the left vertical flow passage 3a to an upper end of the right vertical flow passage 3b.

The horizontal flow passage 4 has an angular sleeve-shaped measurement flow passage housing block 5 having an open top for measuring a fluid. An ultrasonic measurement block 9 including a pair of transceiver mount blocks 8 is disposed in the measurement flow passage housing block 5, wherein the respective transceiver mount blocks 8 are provided with transceivers (omitted from the drawings) in a mutually opposing manner.

Moreover, the measurement flow passage housing block 5 has a multilayered flow passage member 10 that partitions a fluid into a plurality of flat flow passages and a cover 7 that houses and seals the multilayered flow passage member 10 into the measurement flow passage housing block 5.

Accordingly, the cover 7 is placed on top of the horizontal flow passage 4, whereby the measurement flow passage housing block 5 is formed into a shape of an angular sleeve having a rectangular cross sectional profile.

A circular through hole 8a that provides a pass-through in a direction to interconnect the transceiver mount blocks 8 and 8 is provided in each of the transceiver mount blocks 8 and 8, whereby an ultrasonic wave propagation path 8b is formed. The ultrasonic wave propagation path 8b in the direction of measurement in which the transceivers are connected together is laid so as to cross a direction of flow of the fluid at an angle.

A layout pattern in which the ultrasonic wave propagation path 8b is arranged at an angle opposite the flow as mentioned above is called a Z path (Z-path) or a Z technique. The present embodiment provides an exemplification of the Z path layout.

Figure 2:
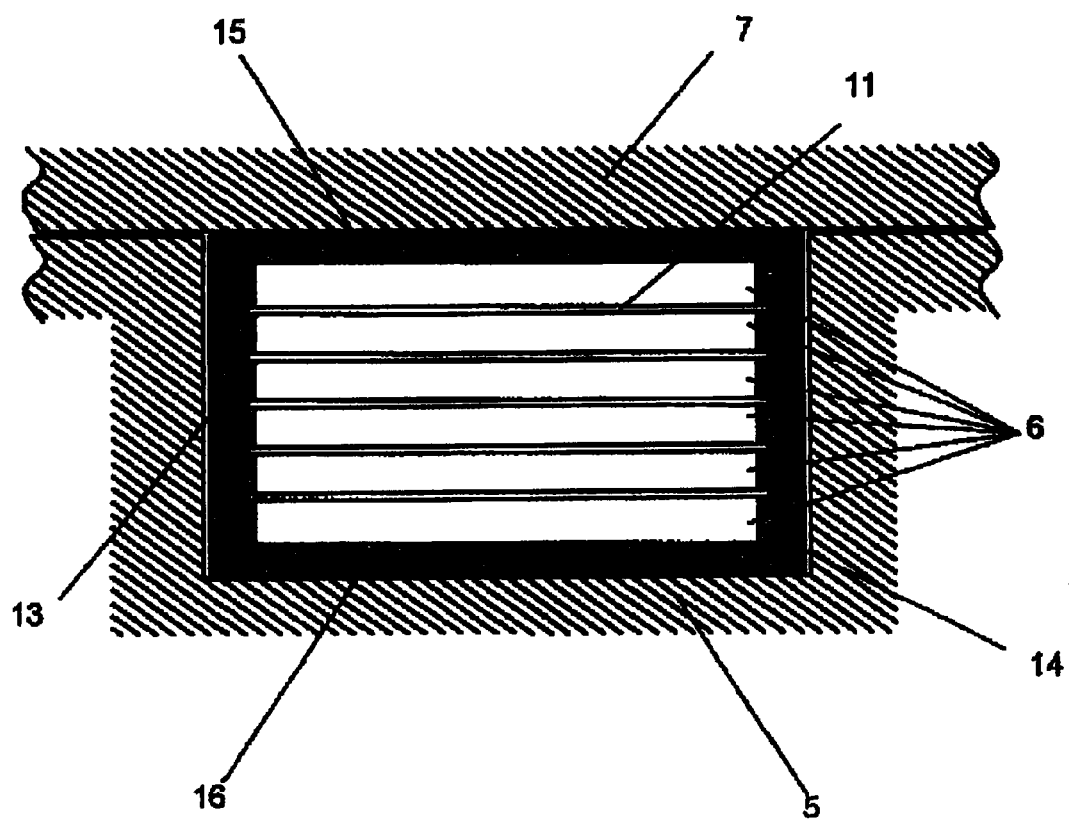
FIG. 2 is a cross sectional view of a principal block of the ultrasonic fluid measurement apparatus.
Figure 3:
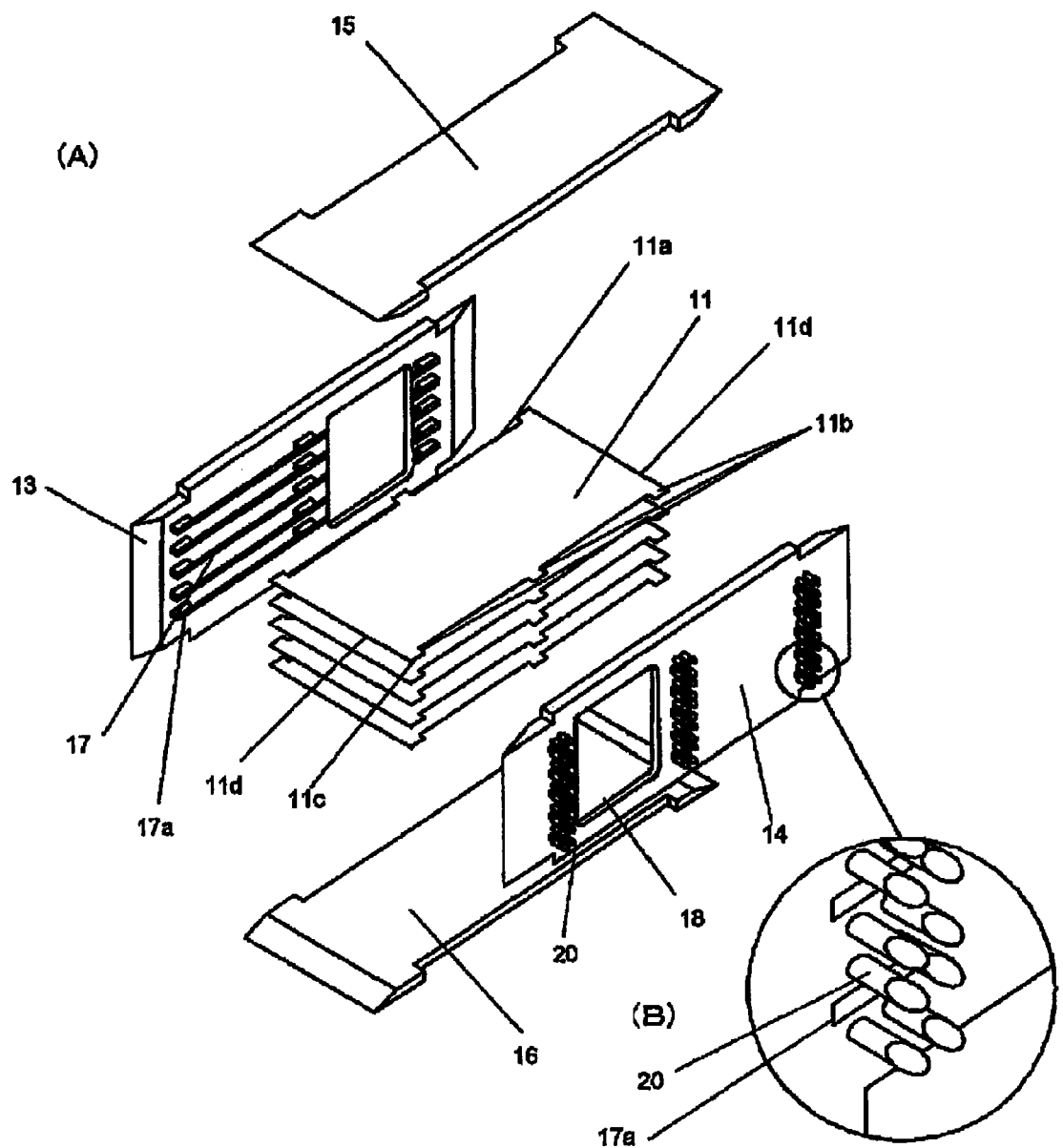
FIG. 3(A) is an exploded perspective view of a multilayered flow passage member.
FIG. 3(B) is an enlarged perspective view of the principal block.

As shown in FIGS. 2 and 3, the multilayered flow passage member 10 is built into the shape of a rectangular box and from partition plates 11 for portioning the measurement flow passage housing block 5 into a plurality of flat flow passages 6; side plates 13 and 14 that support edges 11a of each of the partition plates 11 in alignment with the direction of flow of the fluid; and a top plate 15 and a bottom plate 16 positioned in the vertical direction of the right and left side plates 13 and 14. The partition plates 11 are horizontally held between the left and right side plates 13 and 14 at predetermined intervals.

A plurality of slits 17 for holding the partition plates 11 at predetermined intervals are provided on interior surfaces of the respective side plates 13 and 14. The slits 17 are provided at equal intervals in the vertical direction orthogonal to the flow of the fluid in such a way that the flat flow passages 6 partitioned by the respective partition plates 11 each assume a uniform cross sectional area.

Openings 18 for allowing passage of an ultrasonic wave are formed in the respective side plates 13 and 14 of the multi-layered flow passage member 10 situated on the ultrasonic wave propagation path 8b in a state where the multilayered flow passage member 10 is fitted in the measurement flow passage housing block 5. A filtering member 19 capable of allowing transmission of an ultrasonic wave; for instance, a fine perforated mesh filter, is provided in each of the openings 18.

Each of the partition plates 11 is a thin-plate-shaped member whose entirety assumes a rectangular shape. There are provided, along the respective edges 11a of each of the partition plates 11, a plurality of flanges 11b that are provided so as to protrude outside in a widthwise direction from four corners and a center of the individual partition plate 11 and that each have end faces 11c and longitudinal ends 11d and 11d situated on upper and downstream sides of each of the partition plates with respect to the flowing direction of a fluid.

Meanwhile, insert holes 17a are provided at positions, corresponding to the respective flanges 11b of the partition plate 11, in each of the slits 17 provided on the respective side plates 13 and 14. The end faces 11c of the flanges 11b of the respective partition plates 11 are exposed to the outside through the respective insert holes 17a, and the partition plates 11 are supported by the side plates 13 and 14.

Fusible projections 20 are provided above and below each of the insert holes 17a of the respective side plates 13 and 14. The fusible projections 20 are fused while the flanges 11b of the partition plates 11 are inserted into the respective side plates 13 and 14, whereby the partition plates 11 are fused to the respective side plates 13 and 14.

Figure 4:
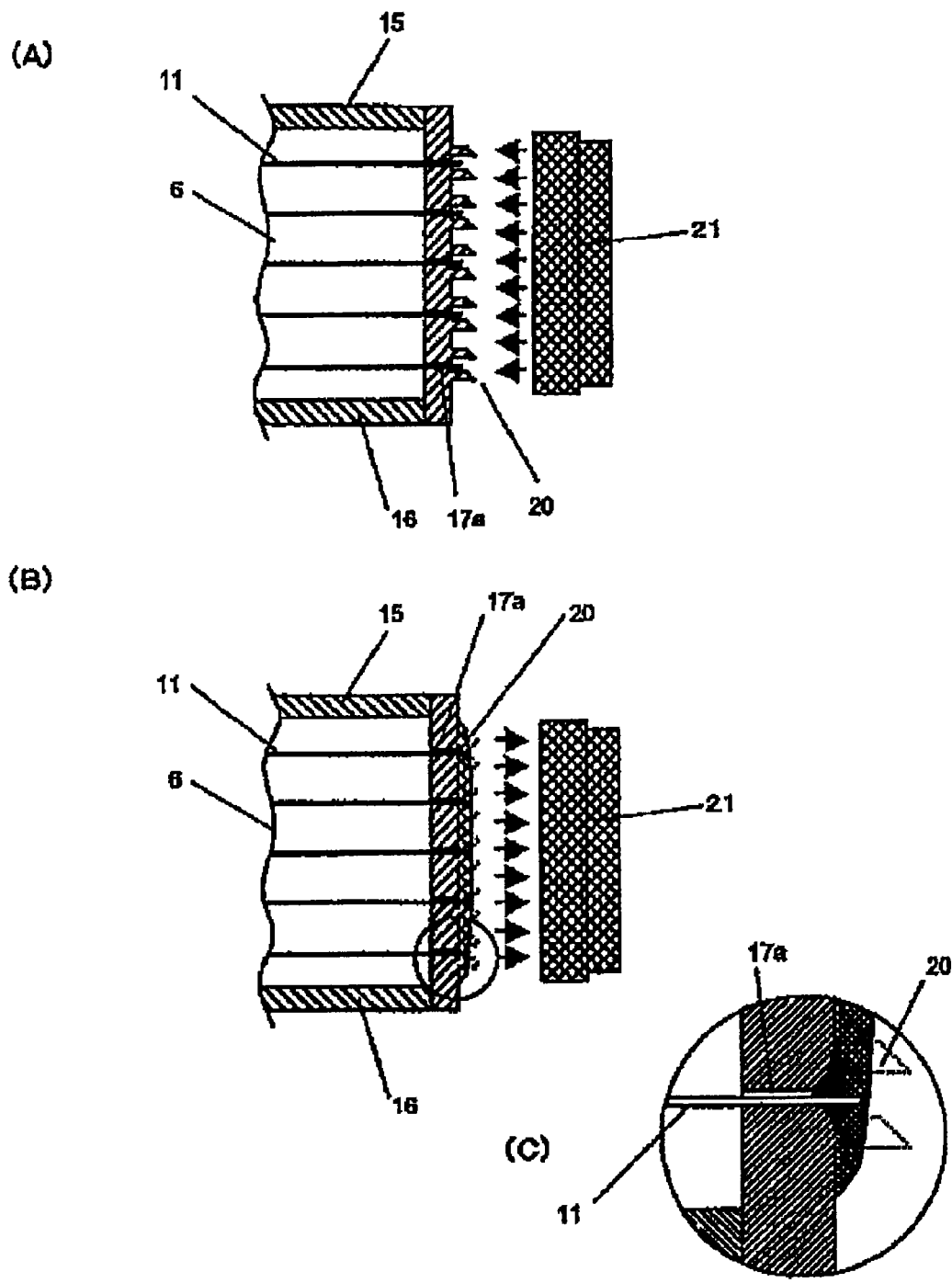
FIGS. 4(A), 4(B) and 4(C) are descriptive views showing steps of fusing the multilayered flow passage member.

As shown in FIGS. 3 and 4, a weld surface on a leading end of the fusible projection 20 is sloped in the vertical direction. When the fusible projections 20 are fused by a heating head 21 of a fusing device, a fused state of a surface located above the partition plate 11 is made different from a fused state of a surface located below the partition plate 11, whereby spacing between the insert hole 17a and the partition plate 11 is formed in a given direction.

In relation to a fusing method, the heating head 21 heated by a heater, for instance, is pressed against the fusible projections 20 as a fusing device the fusible projections 20 located above and below the respective insert holes 17a from the sideway direction of the side plates 13 and 14, as shown in FIG. 4(A), thereby fusing the fusible projections 20 located above and below the respective insert holes 17a and neighborhoods of the fusible projections.

A portion of the fused fusible projections 20 fills clearance between the end faces 11c of the respective partition plates 11 and corresponding insert holes 17a. Alternatively, the resin located in the neighborhoods of the insert holes 17a is fused, thereby filling and solidifying clearance between the end faces 11c of the respective partition plates 11 and corresponding insert holes 17a.

As shown in FIG. 5(B), the heating head 21 is moved away, to thus cool and solidify the fused resin. Subsequently, the top plate 15 and the bottom plate 16 are attached to the top and the bottom of the side plates 13 and 14, whereupon the multilayered flow passage member 10 is completed.

The fusible projections 20 are fused by the heating head 21 while the partition plates 11 remain inserted into the respective insert holes 17a of the side plates 13 and 14. At this time, since the weld surfaces provided at leading ends of the respective fusible projections 20 are sloped in the vertical direction, a fused state provided by the heating head 21 changes according to either side of each of the partition plates 11. The outermost leading end of each of the fusible projections 20 that first contacts the heating head 21 becomes first fused. During the course of the thus-fused fusible projection 20 sequentially becoming fused toward its root, the clearance between the insert hole 17a and each of the partition plates 11 becomes progressively filled from a neighborhood of the outermost leading end of the fusible projection that becomes first fused.

For these reasons, the outermost leading ends of the fusible projections 20 that first come into contact with the heating head 21 are situated lower positions. The respective partition plates 11 are situated under their own weights below the respective insert holes 17a while remaining inserted into the respective insert holes 17a of the side plates 13 and 14. Further, the respective partition plates 11 are rested against lower ends of the respective insert holes 17a located opposite the outermost leading ends of the fusible projections 20 that first become fused, whereupon the respective partition plates 11 become one-sided with respect to the respective insert holes 17a. The partition plates 11 are then fixed by means of positional accuracy of the insert holes 17a. Thus, even when clearance exists between the partition plates 11 and the corresponding insert holes 17a, they can be fixed with superior accuracy by fusing.

The interval between the partition plates 11 can be held with the positional accuracy of the insert holes 17a. Hence, a highly accurate multilayered flow passage member can be formed in a simple configuration while operability, like ease of insertion, is maintained without involvement of an increase in strength of the side plates 13 and 14 to which the partition plates 11 are attached and without use of another member for assuring dimensional accuracy.

The top plate 15 and the bottom plate 16 can be fixed by use of an adhesive, or the like. However, it is also possible to provide top and bottom end faces of the side plates 13 and 14, the top plate 15, and the bottom plate 16 with fitting portions and to simultaneously fuse portions of the fitting portions by the heating head 21 when the fusible projections 20 are fused to areas above and below the respective insert holes 17a while the top plate and the bottom plate remain fitted into the fitting portions.

Second Embodiment

Figure 5:
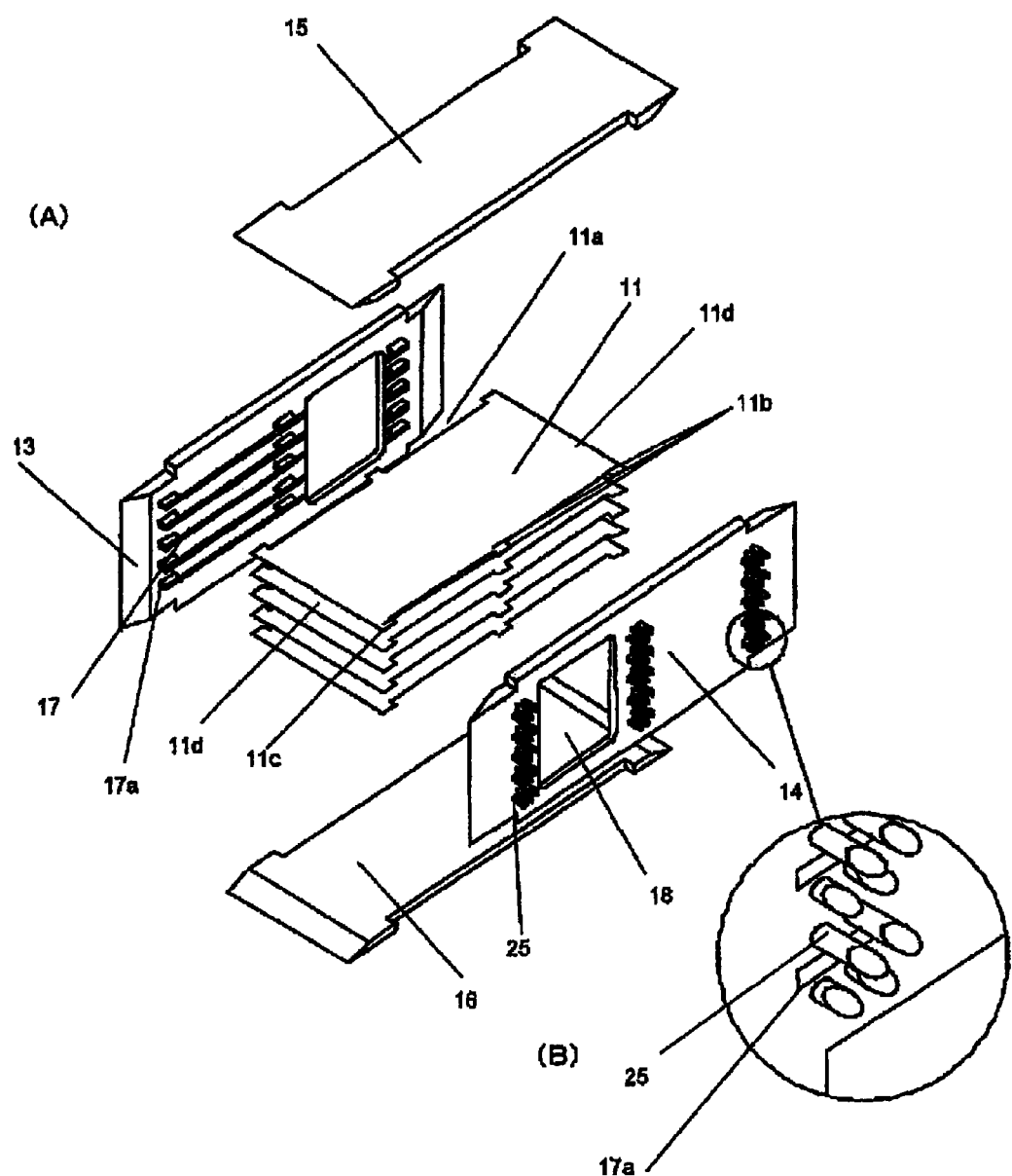
FIG. 5(A) is an exploded perspective view of a multilayered flow passage member of a second embodiment of the present invention.
FIG. 5(B) is an enlarged perspective view of a principal block.
Figure 6:
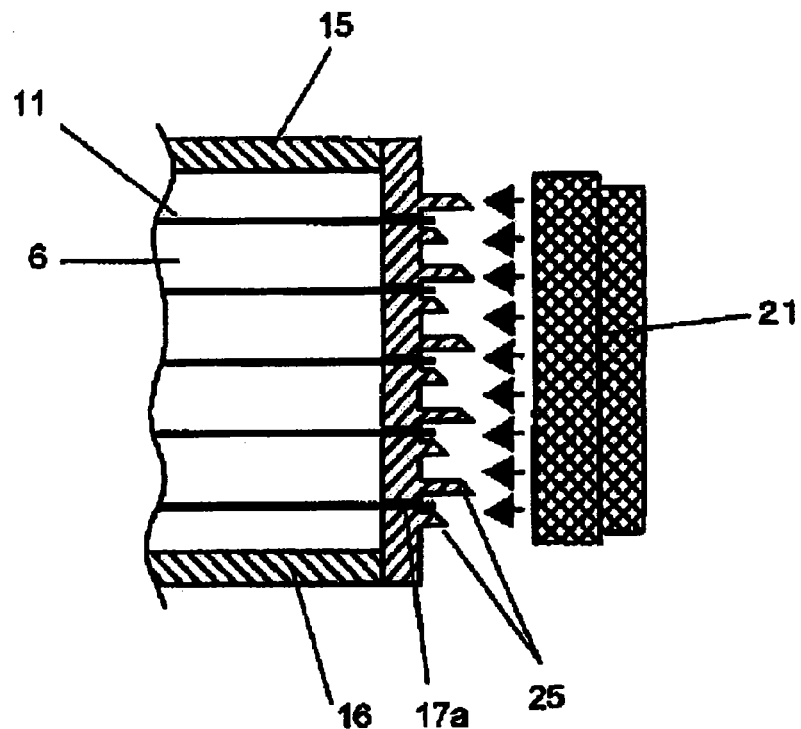
FIGS. 6(A) and 6(B) are descriptive views showing steps of fusing the multilayered flow passage member.
Figure 6:
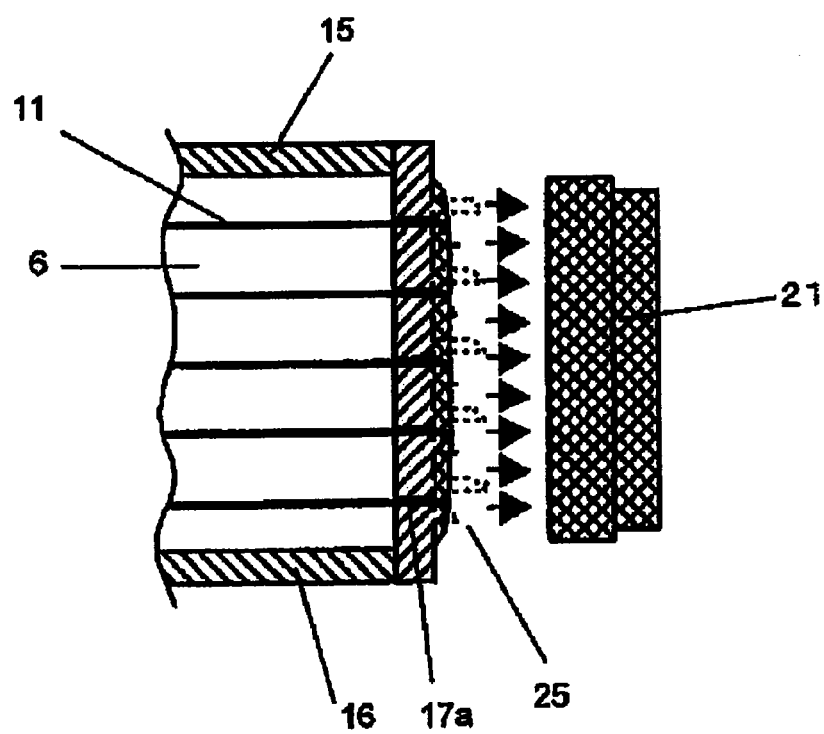
Figure 7:
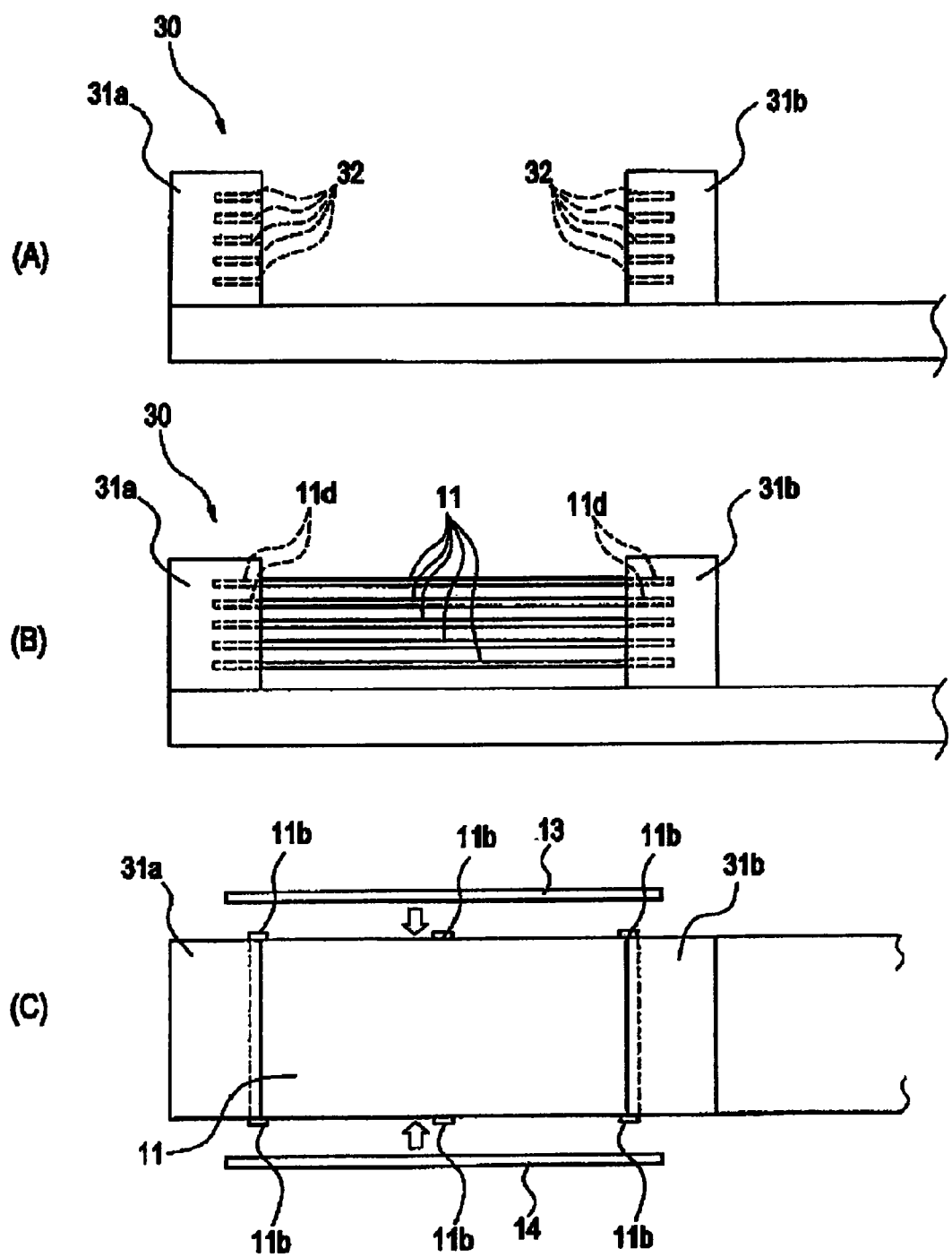
FIGS. 7(A), 7(B) and 7(C) are descriptive views showing steps of manufacturing the multilayered flow passage member.

FIGS. 5 to 7 show a second embodiment of the present invention. Structural elements that exhibit the same operation as that exhibited in FIGS. 3 and 4 are assigned the same reference numerals, and the specific explanations given to the first embodiment are also applied to the structural elements.

As shown in FIGS. 5 and 6, a slope is given, in a vertical direction, to a fuse surface at a leading end of each of fusible projections 25 located above and below the respective insert holes 17a into which portions of each of the partition plates 11 are inserted. Shapes; namely, heights, of the fuse surfaces are also changed, thereby causing the fusible projections 25—that provided above and below the respective insert holes 17a and 17a through which the portions of the partition plates 11 are inserted into the side plates 13 and 14—to become fused in different quantity according to either side of each of the partition plates 11, whereby clearance between the insert holes 17a and each of the partition plates 11 is formed in a given direction.

As shown in FIG. 7, a positioning jig 30 having slits 32 that are set at the same interval as that for the partition plates 11 is used for assembling the multilayered flow passage member.

The method for assembling the multilayered flow passage member 10 is to first place a pair of retaining blocks 31a and 31b each of which has the slits 32 set to the same desired interval as that for the partition plates 11, by use of the positioning jig 30, in such a way that the slits 32 oppose each other.

As shown in FIG. 7(B), the longitudinal ends 11d and 11d of each of the partition plates 11 are inserted into and retained by the slits 32 of the retaining blocks 31a and 31b positioned opposite each other.

When compared with the case of the slits 17 formed in the respective side plates 13 and 14, the position and width of each of the slits 32 provided in the respective retaining blocks 31a and 31b are set so as to commensurate with the interval and thickness of the partition plates 11 with higher accuracy. The partition plates 11 are positioned with high accuracy.

Accordingly, the partition plates 11 are fittingly inserted into the slits 32, whereby the interval among the partition plates 11 is set with high accuracy.

Since a sufficient retaining margin can be ensured for the slits 32 of the retaining blocks 31a and 31b, operability is further enhanced, so long as each of the slits is provided with a guide area (not shown), such as a taper, so as to facilitate insertion of the longitudinal ends 11d and 11d of the partition plate 11.

Next, as shown in FIG. 7(C), the side plates 13 and 14 are caused to approach the side end faces 11c of the respective partition plates 11 retained by the positioning jig 30 to thereby insert the edges 11a of the respective partition plates 11 into the respective insert holes 17a of the slits 17 of the side plates 13 and 14. The respective flanges 11b provided on the respective partition plates 11 are fitted into the corresponding insert holes 17a formed in the slits 17.

Since the slits 17 and the insert holes 17a of the respective side plates 13 and 14 are formed with a sufficient margin as compared with the slits 32 of the retaining block 31, and hence the partition plates 11 can be easily inserted.

As shown in FIG. 6(A), the heating head 21 heated by; for instance, a heater, is pressed sideways against the side plates 13 and 14 as a fusing device the fusible projections 25 above and below the respective insert holes 17a, thereby fusing the fusible projections 25 and their neighborhoods above and below the respective insert holes 17a.

A portion of the fused fusible projections 25 fills clearance between the end faces 11c of the partition plates 11 and the insert holes 17a. Alternatively, the resin located around the insert holes 17a is fused, to thus fill clearance between the end faces 11c of the partition plates 11 and the insert holes 17a, whereby the partition plates are solidified while being more precisely positioned and maintained by the positioning jig 30.

As shown in FIG. 6(B), the heating head 21 is moved away. After the fused resin has been cooled and solidified, the top plate 15 and the bottom plate 16 are attached to the top and bottom sides of the side plates 13 and 14, thereby completing the multilayered flow passage member 10.

The fuse surface at the leading end portion of each of the fusible projections 25 is vertically sloped and changed in terms of a shape; namely, a height. Therefore, there is yielded an effect of the fuse surface at the leading end being sloped in the vertical direction.

Moreover, the fusible projections 25 provided above and below the respective insert holes 17a into which the portions of the partition plates 11 are to be inserted are changed in terms of a shape; i.e., a height, thereby causing the fusible projections 25—that are provided above and below the respective insert holes 17a through which portions of each of the partition plates 11 are inserted into the side plates 13 and 14—to become fused in different quantity according to either side of each of the partition plates 11. Hence, the fused state provided by the heating head 21 changes according either side of each of the partition plates 11. The fused portions of the fusible projections 25 sequentially flow from a position where the fusible projections 25 are fused in large quantity to another position where the fusible projections 25 are fused in smaller quantity, to thus be smoothed. Consequently, the clearance between the insert holes 17a and each of the partition plates 11 is progressively filled from a neighborhood of the position where the fusible projections 25 are fused in large quantity.

Therefore, the partition plates 11 are pressed further from the position where the fusible projections 25 are fused in large quantity to the position where the fusible projections 25 are fused in smaller quantity, whereupon the partition plates 11 become one-sided with respect to the respective slits 32 of the positioning jig 30. Further, the partition plates 11 become fixed, while remaining further one-sided, by means of positional accuracy of the slits 32 of the positioning jig 30. Even when clearance exists between the respective partition plates 11 and the respective insert holes 17a, they can be fixed with superior accuracy by fusing.

The interval between the partition plates 11 can be held with high accuracy. Hence, a highly accurate multilayered flow passage member can be formed in a simple configuration while operability, like ease of insertion, is maintained without involvement of an increase in strength of the side plates 13 and 14 to which the partition plates 11 are attached and without use of another member for assuring dimensional accuracy.

As mentioned above, even when the positioning jig 30 is used under the method for assembling the multilayered flow passage member 10, the partition plates can be fixed, while remaining further one-sided, by means of positional accuracy of the slits 32 of the positioning jig 30. Moreover, the multilayered flow passage member 10 that is superior to the positioning jig 30 in terms of accuracy can be formed by a simple configuration.

Figure 8:
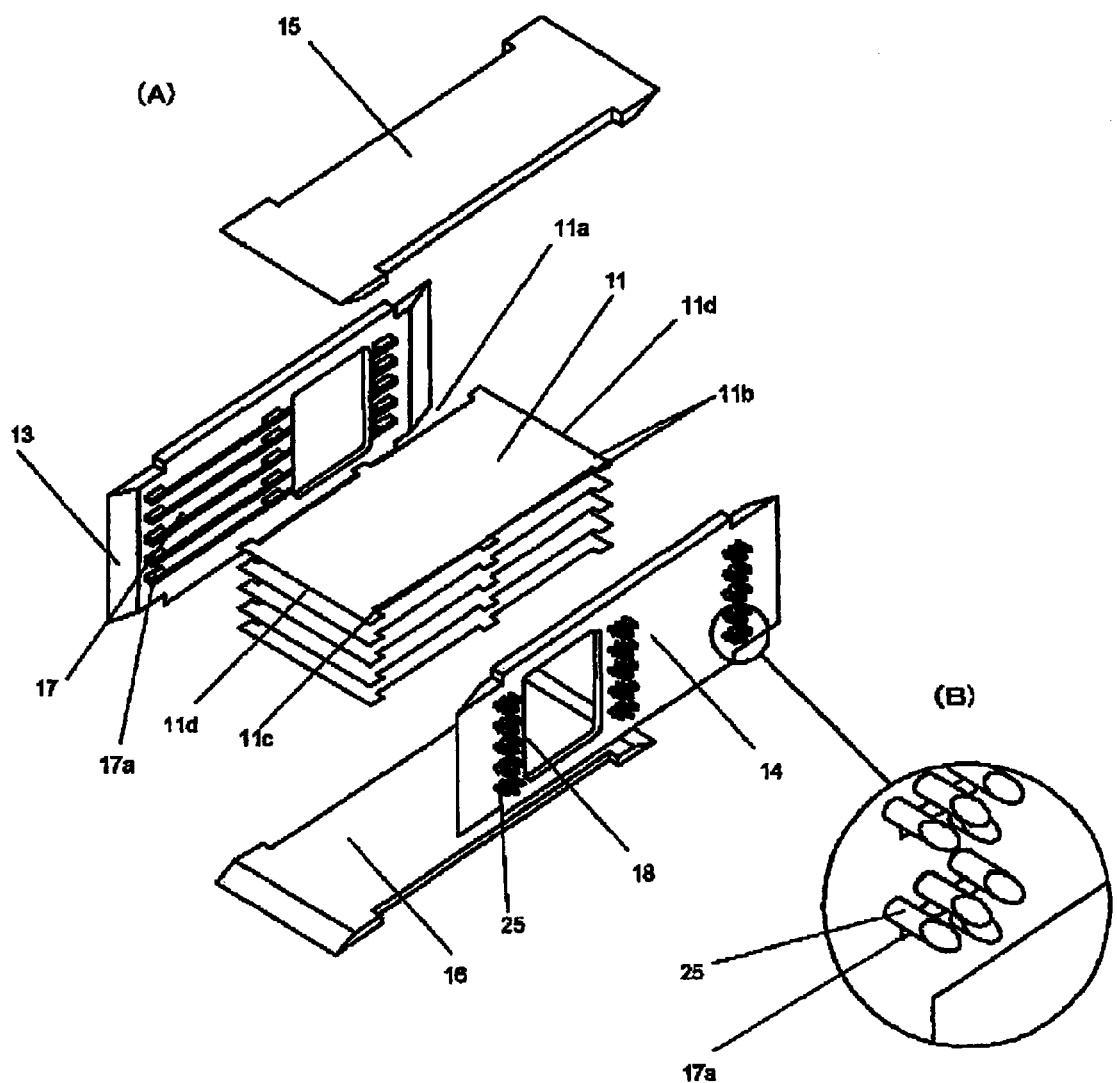
FIG. 8(A) is an exploded perspective view showing a multilayered flow passage member of another modification of the present invention.
FIG. 8(B) is an enlarged perspective view of a principal block.

An explanation has been given on the assumption that the fusible projections 25 are provided in the same number above and below each of the insert holes 17a into which portions of each of the partition plates are inserted. However, as shown in FIG. 8, the number of fusible projections may also be changed. Moreover, the fusible projections 25 may also be changed in terms of a diameter and a cross-sectional profile (not shown). Alternatively, the fusible projections can also be controlled by fusing requirements for the heating head 21, or the like. Further, the other portions of the multilayered flow passage member may assume any configuration, so long as the configuration falls within a range where the objective of the present invention is accomplished.

Third Embodiment

Figure 9:
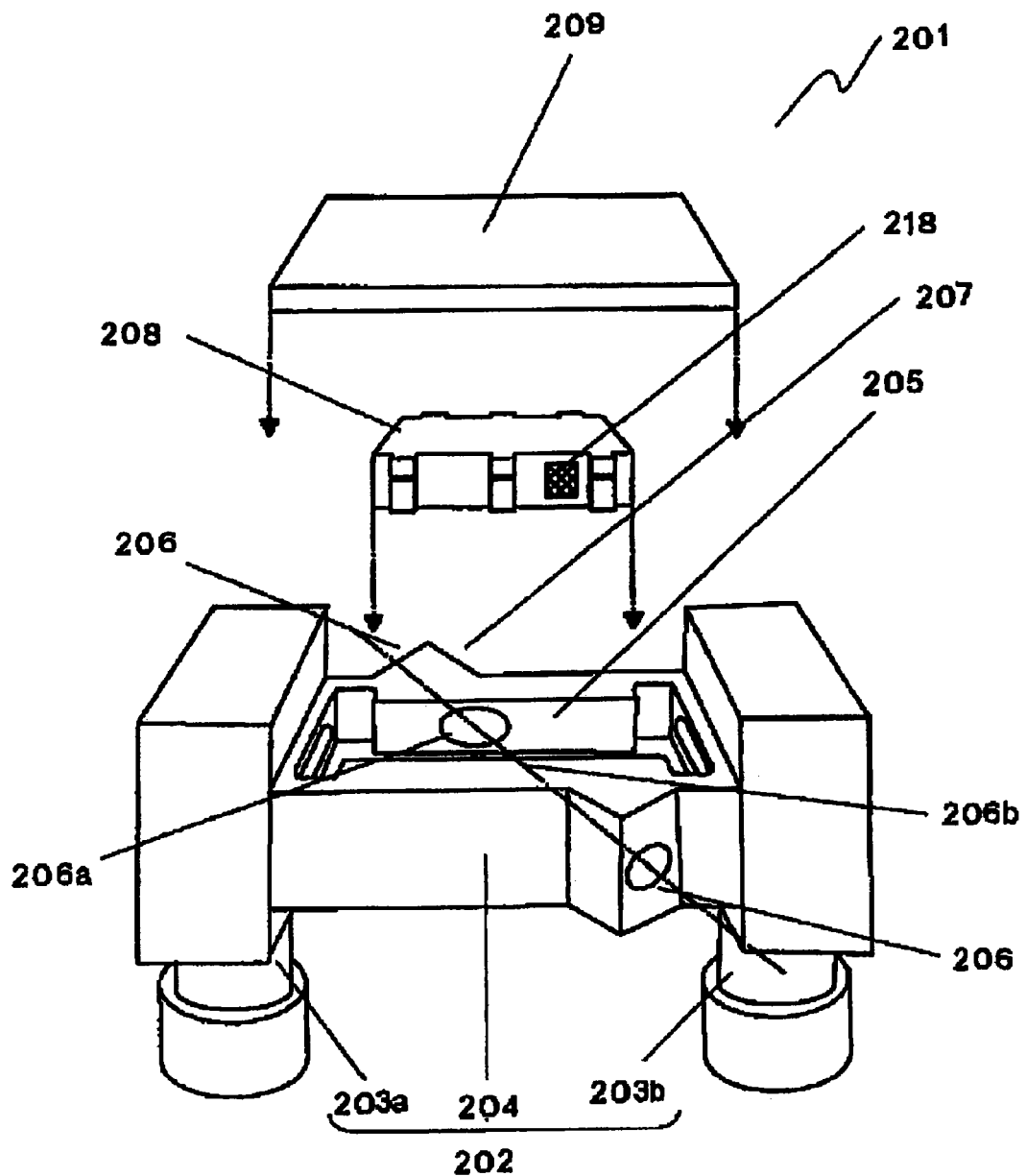
FIG. 9 is an exploded perspective view of an ultrasonic fluid measurement apparatus of a third embodiment of the present invention.

As shown in FIG. 9, a fluid passage 202 of an ultrasonic fluid measurement apparatus 201 is formed substantially into the shape of an inverted letter U and from left and right vertical flow passages 203a and 203b and a horizontal flow passage 204 connecting together upper end portions of the respective left and right vertical flow passages 203a and 203b.

The horizontal flow passage 204 has a measurement flow passage housing block 205 that has an open top and that assumes a rectangular shape; namely, an oblong cross sectional profile. Transceiver mount blocks 206 are formed on positions of mutually-opposing walls close to short sides, thereby making up an ultrasonic measurement block 207.

A multilayered flow passage member 208 that partitions fluid into a plurality of flat flow passages is housed in the measurement flow passage housing block 205. The open top is sealed by a cover 209.

Circular through holes 206a are provided in the transceiver mount blocks 206 positioned on the walls close to the short sides in the measurement flow passage housing block 205, whereby an ultrasonic wave propagation path 206b is formed so as to cross the flowing fluid at an angle. A layout pattern in which such an ultrasonic wave propagation path 206b is set at an angle with respect to a flow is a so-called Z path (Z-path) or called a Z technique.

Figure 10:
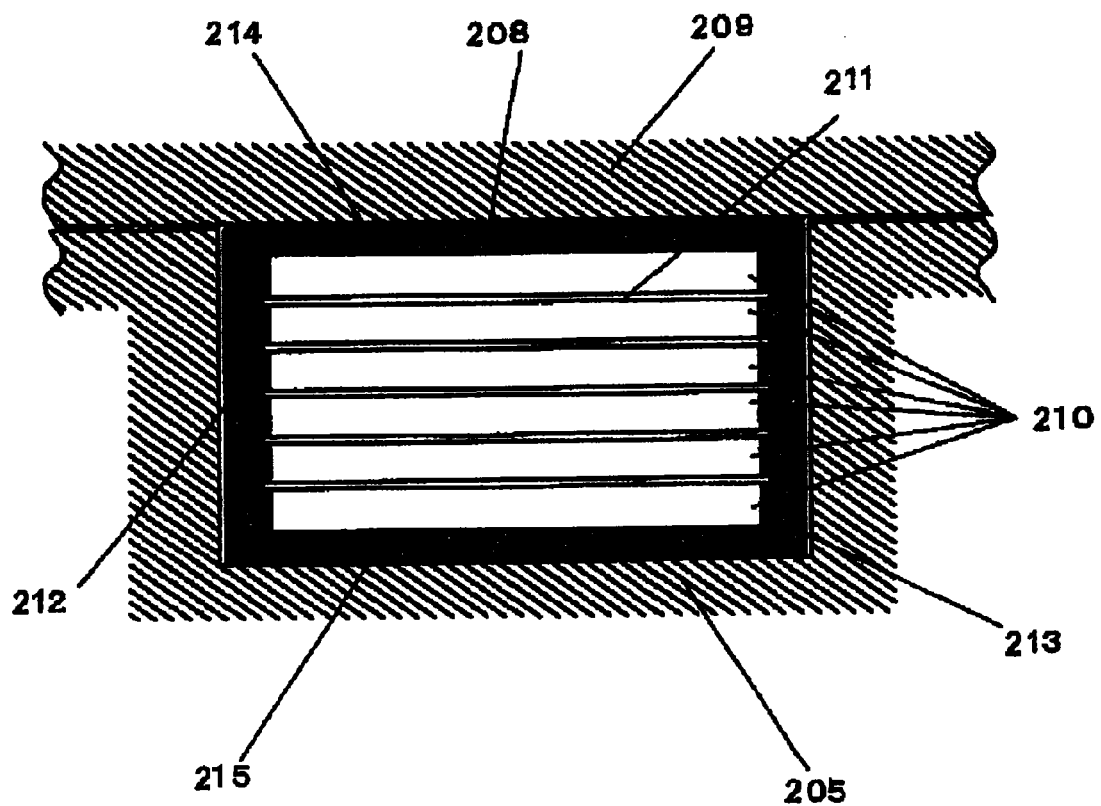
FIG. 10 is a cross sectional view of a principal block of the ultrasonic fluid measurement apparatus.
Figure 11:
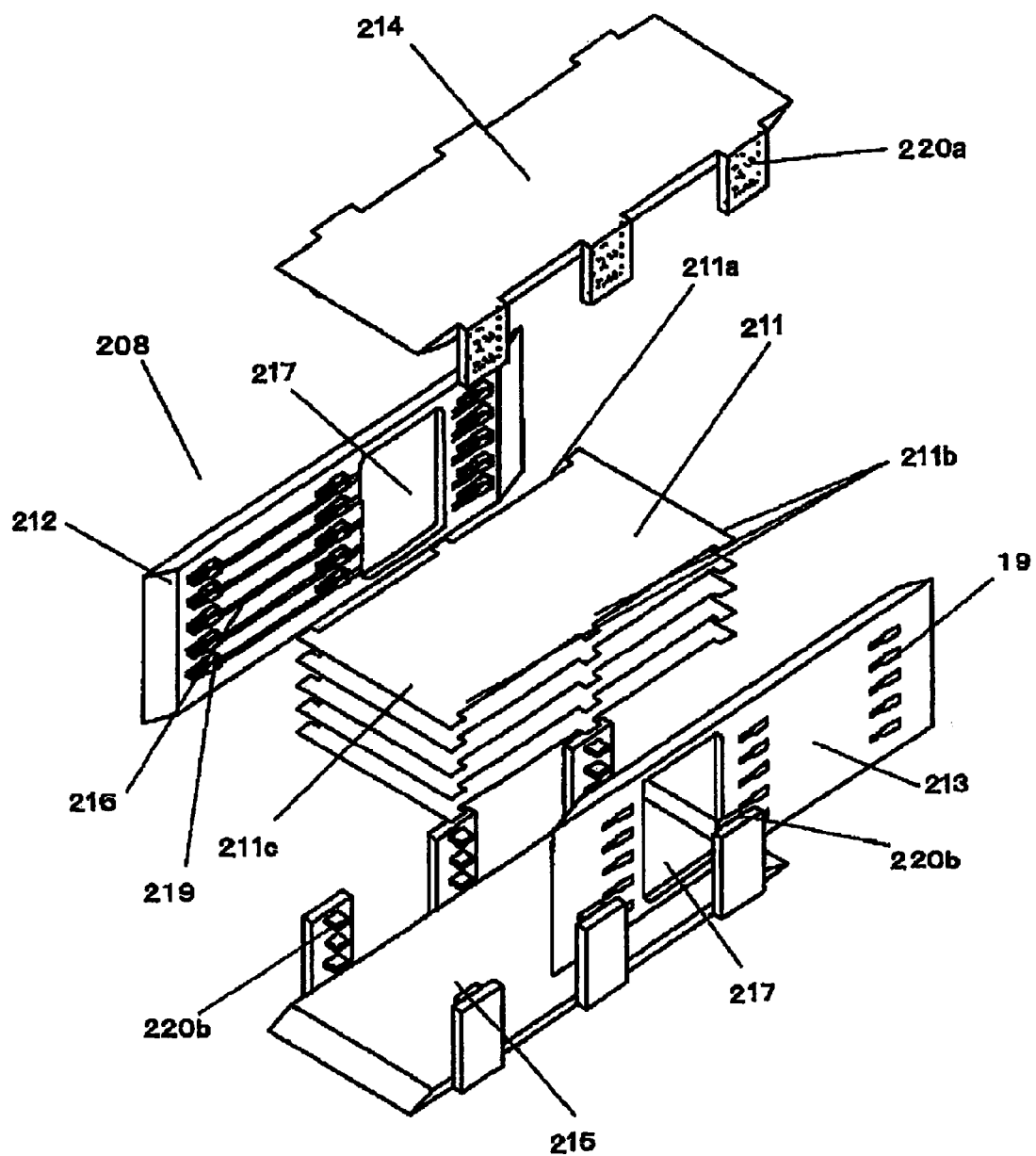
FIG. 11 is an exploded perspective view of a multilayered flow passage member of the ultrasonic fluid measurement apparatus.
Figure 12:
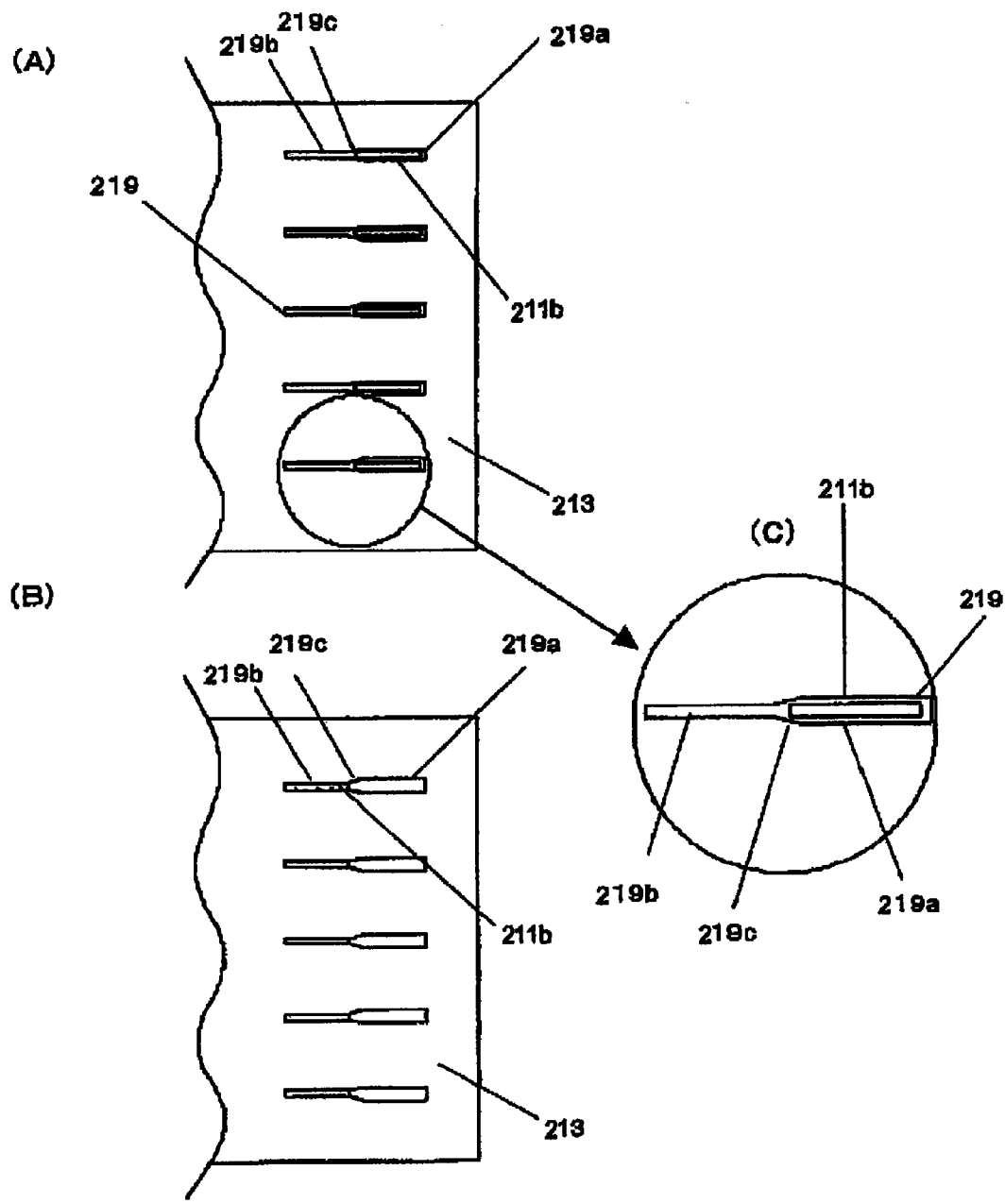
FIGS. 12(A), 12(B) and 12(C) are descriptive views showing steps of assembling the multilayered flow passage member.

As shown in FIGS. 10 to 12, the multilayered flow passage member 208 is built, into the shape of a rectangular box, from partition plates 211 made of thin-plate-shaped members for partitioning a measurement flow passage into a plurality of flat flow passages 210, side plates 212 and 213 that support edges 211a of the respective partition plates 211 extending along a direction of flow of a fluid, and a top plate 214 and a bottom plate 215 placed on the side plates 212 and 213 in its vertical direction. The partition plates 211 are horizontally held at a predetermined interval by the left and right side plates 212 and 213.

A plurality of slits 216 for holding the partition plates 211 at a predetermined interval are laid on respective interior surfaces of the side plates 212 and 213. The slits 216 are provided at a uniform interval in the vertical direction orthogonal to the flow of a fluid in such a way that the flat flow passages 210 partitioned by the partition plates 211 each assume a uniform cross sectional area.

An ultrasonic wave passage opening 217 is formed in each of the side plates 212 and 213 of the multilayered flow passage member 208 in correspondence with the ultrasonic wave propagation path 206b. Each of the openings 217 is equipped with a filtering member 218 that allows passage of an ultrasonic wave; for instance, fine perforated mesh metal, or the like.

Support portions 211b are provided on front, back, and center portions on each of the edges 211a of the respective partition plates 211, so as to protrude outside in a widthwise direction.

In the meantime, insert holes 219 are formed at positions, which correspond to the respective support portions 211b, in the respective slits 216 provided on the respective side plates 212 and 213. End faces 211c of the respective support portions 211b come outside through the corresponding insert holes 219.

Each of the insert holes 219 includes an insert portion 219a having a clearance that is greater than a thickness and width of each of the support portions 211b, a stationary portion 219b having a clearance substantially identical with a thickness of each of the support portions 211b, and a guide portion 219c that smoothly connects the insert portion 219a to the stationary portion 219b.

The support portions 211b of the respective partition plates 211 are inserted into the corresponding insert portions 219a of the insert holes 219 in the side plates 212 and 213. Subsequently, the support portions 211b are slid toward the stationary portions 219b through the respective guide portions 219c, whereby the partition plates 211 are fixed to the side plates 212 and 213.

The partition plates 211 are thereby retained by the stationary portions 219b of the respective insert holes 219, so that the interval between the partition plates 211 can be positioned with high accuracy.

Specifically, ease of insertion of the support portions 211b of the partition plates 211 into the insert holes is assured by the insert portions 219a of the respective insert holes 219 of the side plates 212 and 213. Further, the support portions are slid toward the stationary portions 219b, whereby the support portions 211b are fastened with high accuracy.

Further, the guide portion 219c that provides a smooth connection establishes a communication between the insert portion 219a and the stationary portion 219b, so that operation can be smoothly performed.

Moreover, the insert portions 219a of the insert holes 219 in the side plates 212 and 213 are configured so as to be closed as a result of a closure device 220a formed integrally on the top plate 214 and the closure device 220b formed integrally on the bottom plate 215 being inserted into the insert portions.

Therefore, opening caused by presence of the insert portions 219a intended for fixing the partition plates 211 to the side plates 212 and 213 can be closed. Further, a return of the support portions 211b of the partition plates 211 from the stationary portions 219b to the insert portions 219a can also be prevented.

Therefore, it becomes possible to fasten the partition plates 211 to the side plates 212 and 213. Alternatively, it becomes possible to fasten the side plates 212 and 213 to either the top plate 214 or the bottom plate 215 or simultaneously fasten the side plates to both the top plate and the bottom plate. Thus, a multilayered flow passage member can be readily assembled by a simple configuration.

Specifically, fastening the partition plates 211 to the side plates 212 and 213 is effected as a result of the partition plates 211 being situated inside and the side plates 212 and 213 supporting both sides of the respective partition plates. Further, the top plate 214 that is integrally provided with the closure device 220a and that assumes a C-shaped cross section and the bottom plate 215 that is integrally provided with the closure device 220b and that also assumes a C-shaped cross section press the side plates 212 and 213 from the outside.

Further, in addition to preventing the support portions 211b of the partition plates 211 from coming free from the respective stationary portions 219b, the closure device 220a and 220b prevent the respective insert portions 219a from coming off from the insert portions. Therefore, a multilayered flow passage member can be assembled and configured without use of another fastening device. The number of components and assembly steps can also be curtailed, so that a highly accurate multilayered flow passage member is produced at low cost.

In particular, force acting so as to cancel fastening of the partition plates 211 to the side plates 212 and 213; namely, force for letting the support portions 211b of the partition plates 211 return from the stationary portions 219b to the insert portions 219a and come off from the insert portions, differs in terms of a direction from force for holding the closure device 220a integrally molded in the top plate 214 and the closure device 220b integrally molded in the bottom plate 215 fitted in the respective insert portions 219a. Further, force for holding the closure device 220a and 220b fitted into the respective insert portions 219a differs in terms of a direction from force for letting the top plate 214 having the integrally-molded closure device 220a and the bottom plate 215 having the integrally-molded closure device 220b press the side plates 212 and 213, to thus interfere with each other. Therefore, tighter fastening is thus effected.

Fourth Embodiment

FIGS. 13 to 16 show a fourth embodiment. For the sake of convenience, a configuration that exhibits the same working effect as that shown in FIGS. 11 and 12 is assigned the same reference symbol, and the explanation provided in connection with the first embodiment is quoted for specific explanation of the configuration.

Figure 13:
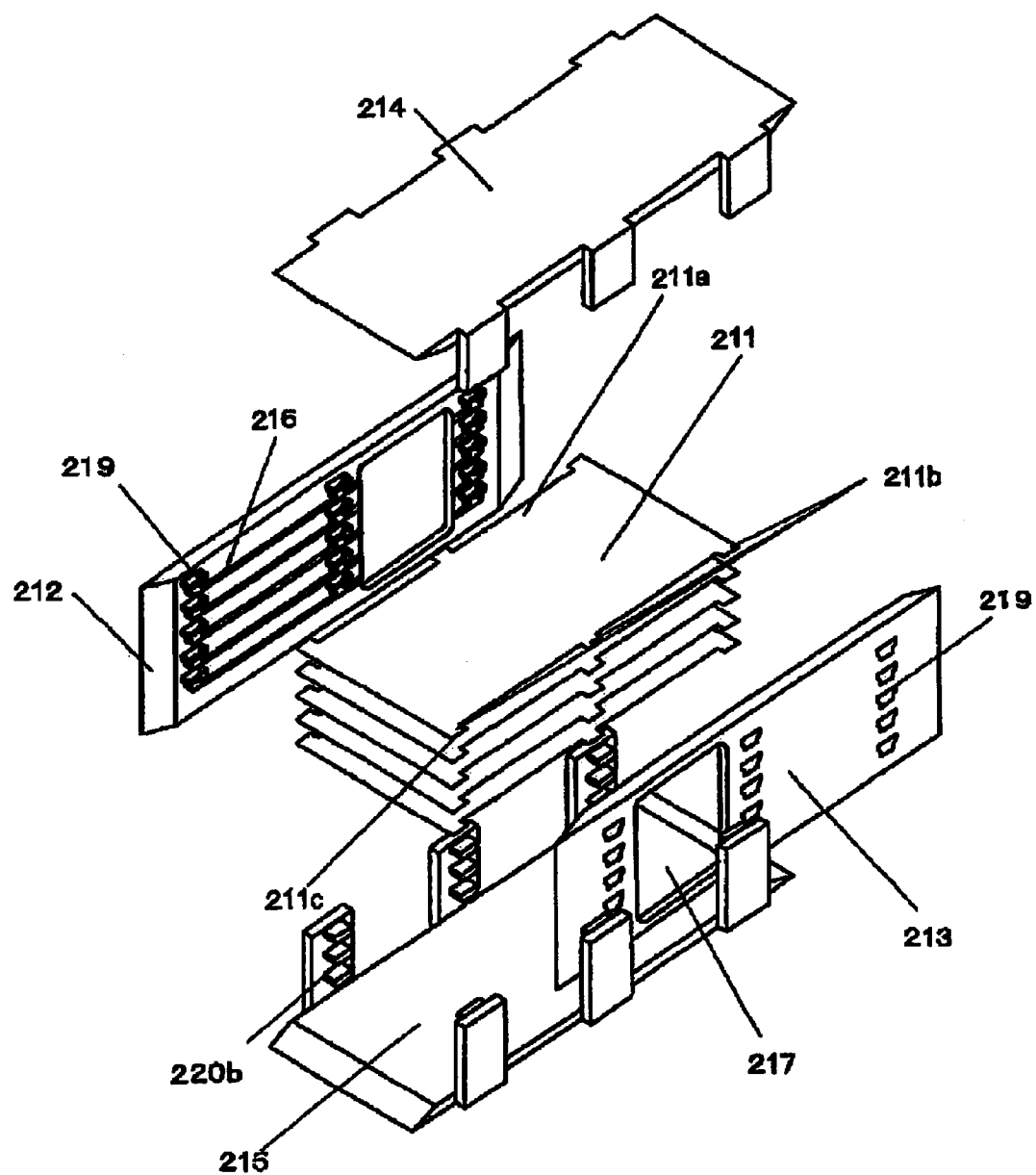
FIG. 13 is an exploded perspective view of a multilayered flow passage member of a fourth embodiment of the present invention.
Figure 14:
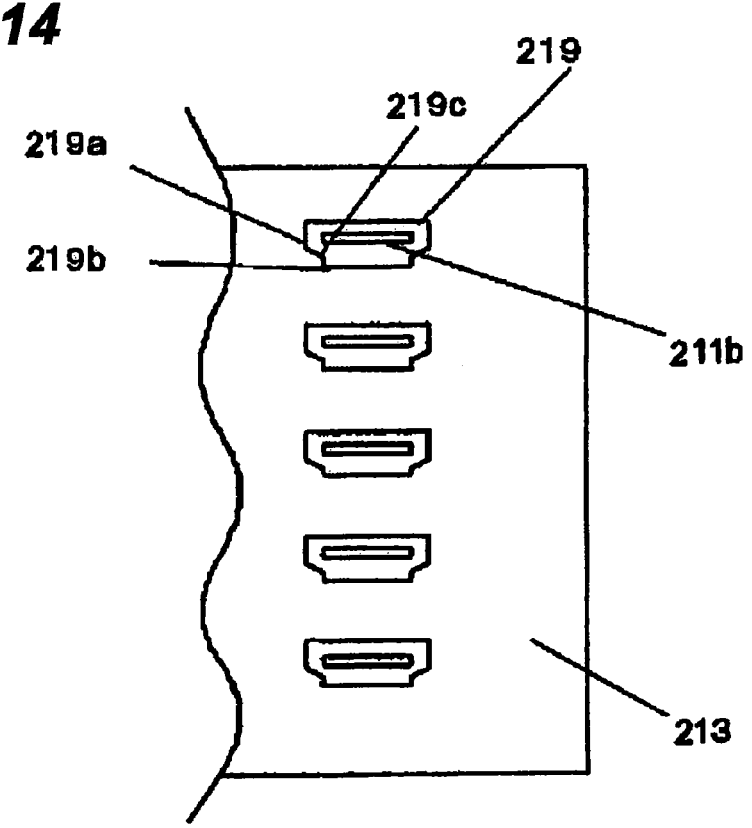
FIGS. 14(A) and 14(B) are descriptive views sowing steps of assembling the multilayered flow passage member.
Figure 14:
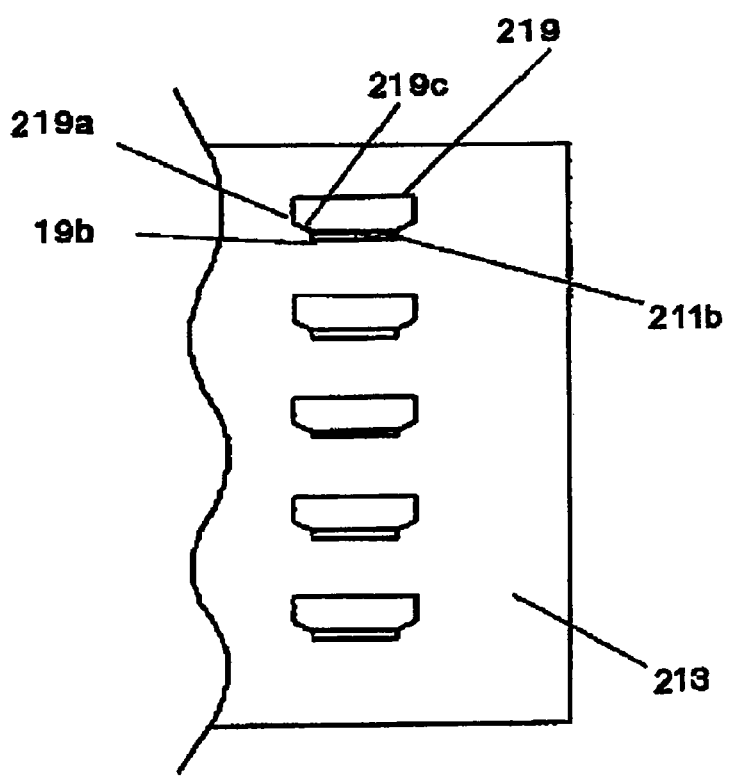

As shown in FIGS. 13 and 14, each of the insert holes 219 includes the insert portion 219a having a clearance that is greater than a thickness and width of each of the support portions 211b, the stationary portion 219b that is situated downward of the insert portion 219a and that has a clearance substantially identical with a thickness of the support portion 211b, and the guide portion 219c that smoothly connects the insert portion 219a to the stationary portion 219b.

By the configuration mentioned above, the support portions 211b of the respective partition plates 211 are inserted into the corresponding insert portions 219a in the side plates 212 and 213. Subsequently, the support portions 211b are slid toward the stationary portions 219b located beneath the insert portions 219a, whereby the partition plates 211 are fixed by the side plates 212 and 213.

Specifically, ease of insertion of the support portions 211b of the partition plates 211 are assured by the insert portions 219a of the side plates 212 and 213. Further, the support portions 211b are slid toward the stationary portions 219b, whereby highly accurate fastening of the support portions 211b of the partition plates 211 can be assured.

As mentioned above, the retaining margin of each of the partition plates 211 fastened by the stationary portions 219b of the side plates 212 and 213 can be defined by a substantially entire thickness of each of the side plates 212 and 213 and a width of each of the stationary portions 219b. Interval between the partition plates 211 can be held by means of the positional accuracy of the stationary portions 219b of the respective insert holes 219. Hence, strength for fastening the partition plates 211 to the side plates 212 and 213 can be sufficiently assured while operability, like ease of insertion, is maintained. Further, a highly accurate multilayered flow passage member can be formed by a simple configuration and without use of another member for assuring dimensional accuracy.

In the fourth embodiment, a match exists between a direction in which the support portions 211b of the partition plates 211 are slid from the insert portions 219a of the insert holes 219 of the side plates 212 and 213 toward the stationary portions 219b of the same and a direction in which the partition plates 211 are piled. Hence, so long as the width and direction of the support portions 211b of the partition plates 11 to be piled up and the width and direction of the stationary portions 219b are changed, one insert hole 219 can fix a plurality of partition plates 11.

Figure 15:
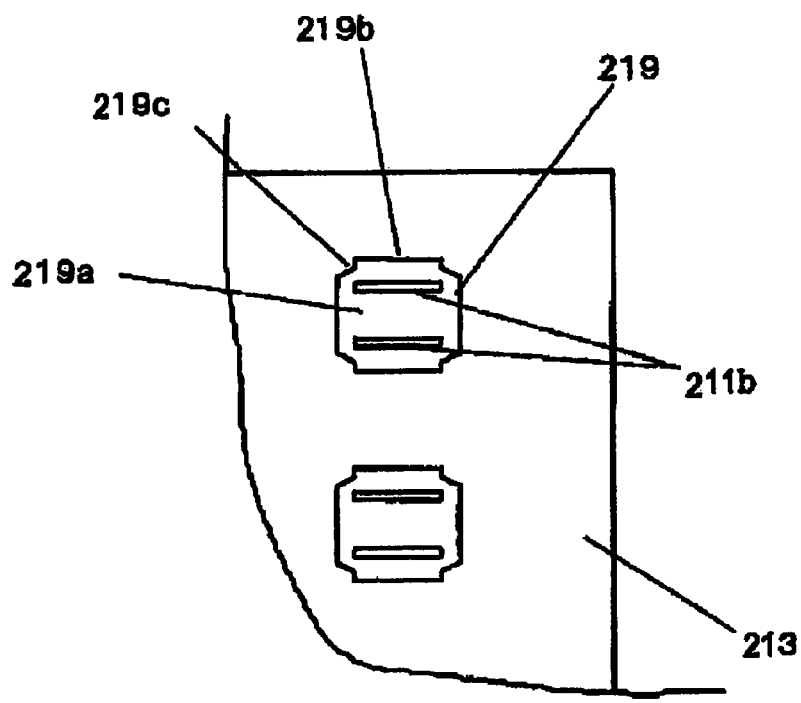
FIGS. 15(A) and 15(B) are descriptive views showing steps of assembling a multilayered flow passage member of another modification.
Figure 15:
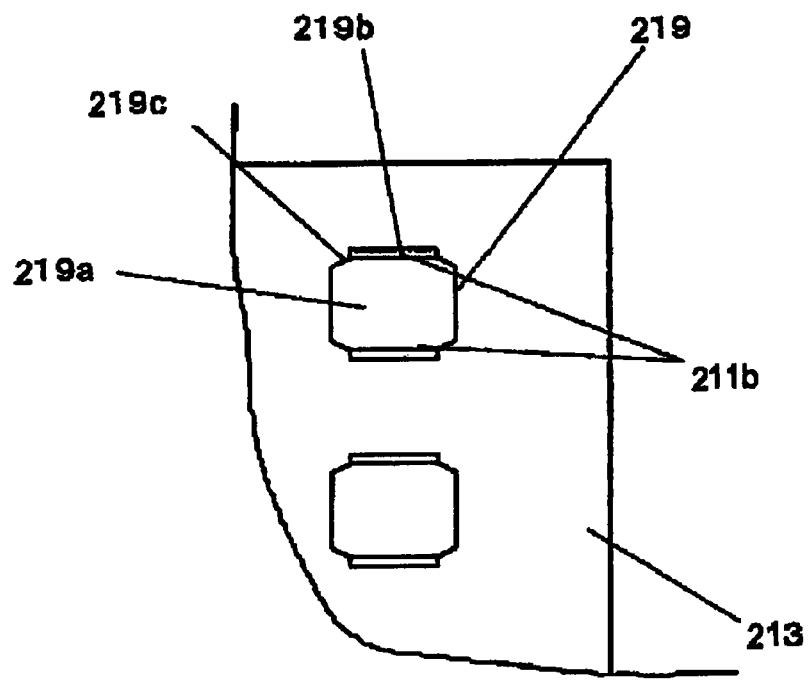
Figure 16:
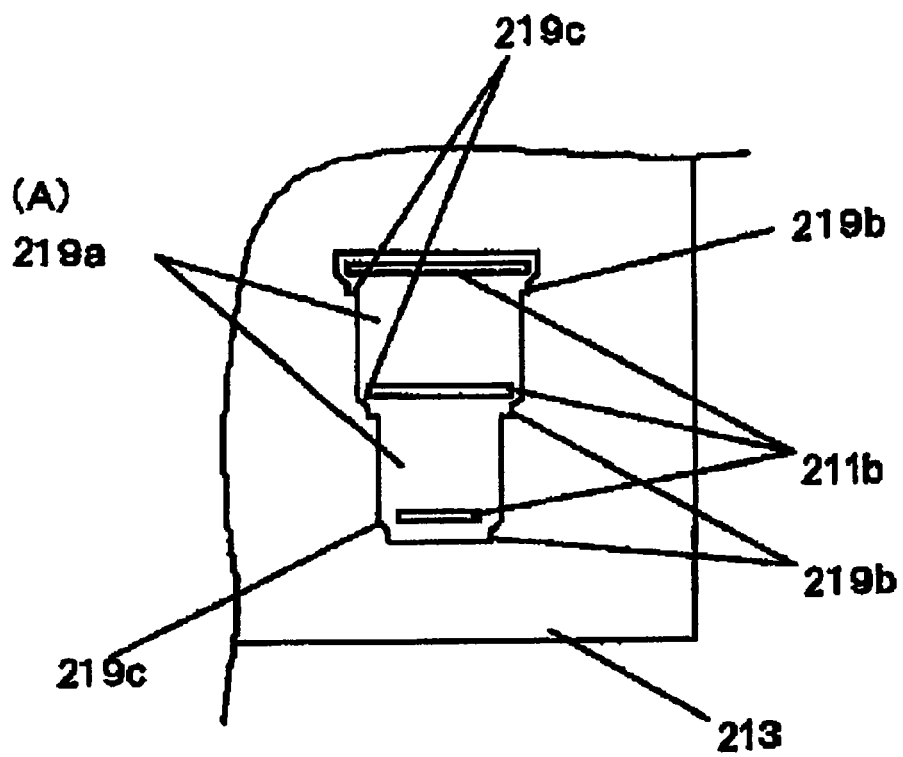
FIGS. 16(A) and 16(B) are descriptive views showing steps of assembling a multilayered flow passage member of still another modification.
Figure 16:
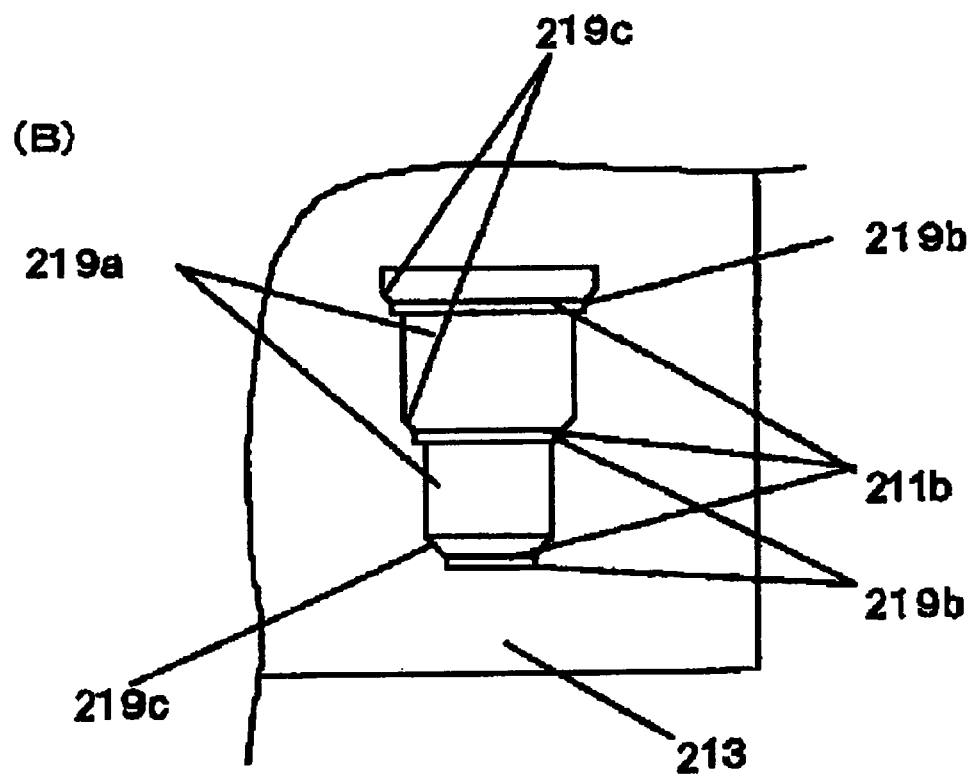

For instance, as shown in FIG. 15, the stationary portion 219b is provided on an upper side and a lower side in the insert portion 219a of the individual insert hole 219. The support portions 211b of the two partition plates 211 can be fastened by one insert hole 219. As shown in FIG. 16, so long as the stationary portions 219b having different widths and the guide portions 219c having different widths are formed in a multistage fashion within each of the insert holes 219, one insert hole 219 can fix the support portions 211b of the plurality of partition plates 211.

In the third embodiment, the stationary portion 219b is positioned in a lateral portion of each of the insert portions 219a. When compared with the example configuration described in connection with the fourth embodiment, the configuration yields an advantage of strong holding force, because upper and lower surfaces of each of the support portions 211b of the respective partition plates 211 are held by the corresponding stationary portions 219b of the respective insert holes 219. In the example configuration described in connection the four embodiment, the stationary portion 219b is positioned on a lower side of each of the insert portion 219a. The configuration involves a shorter travel distance, which yields an advantage of superior operability. Moreover, retaining force is yielded by fitting the closure device 220a and 220b into the respective insert portions 219a. Hence, any of the configurations can be selected. Moreover, any configuration can be selected for other portions, so long as the objective of the present invention is accomplished.

Fifth Embodiment

Figure 17:
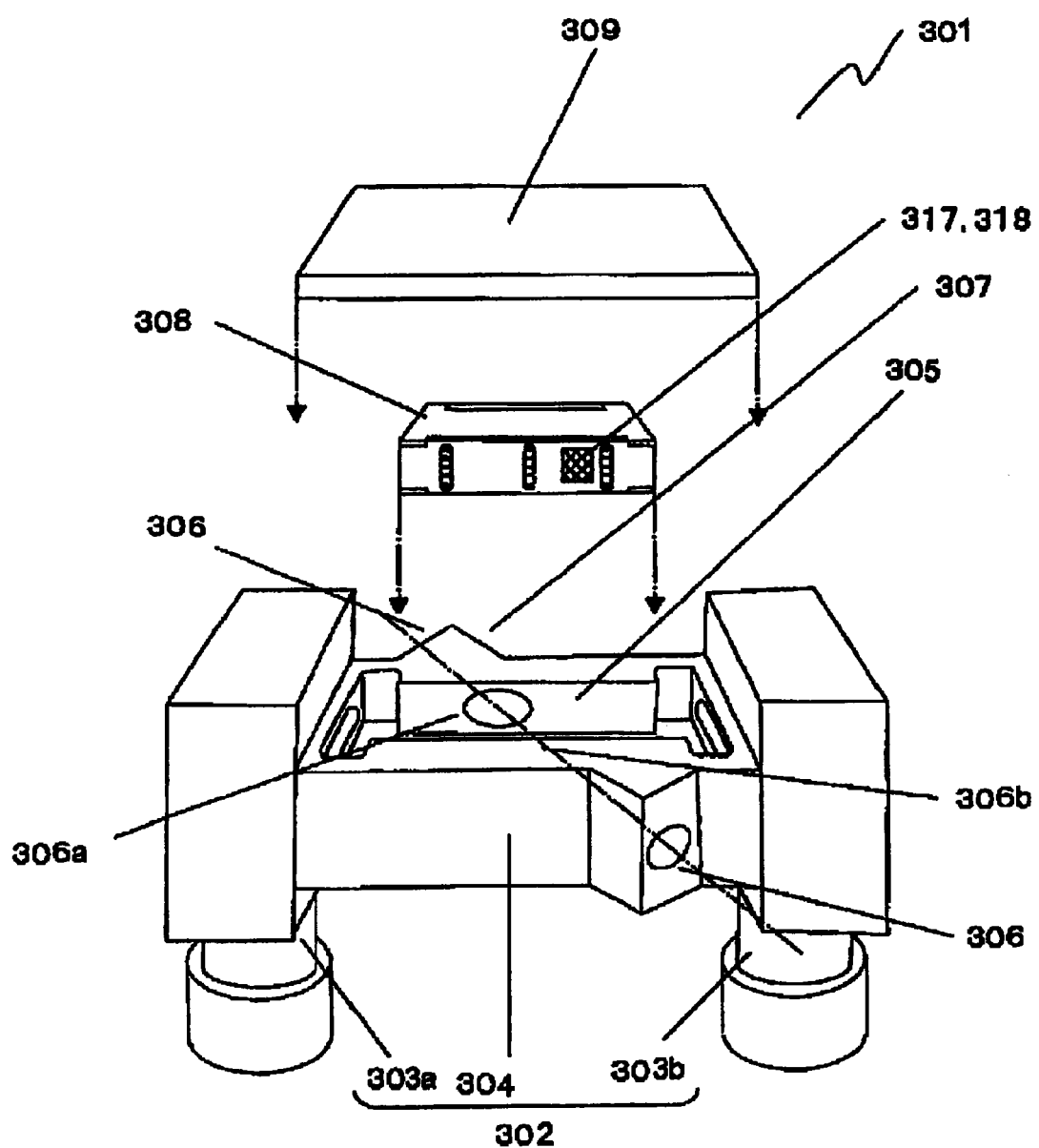
FIG. 17 is an exploded perspective view of an entire ultrasonic fluid measurement apparatus of a fifth embodiment of the present invention.

As shown in FIG. 17, a fluid passage 302 of an ultrasonic fluid measurement apparatus 301 is formed substantially into the shape of an inverted letter U and from left and right vertical flow passages 303a and 303b and a horizontal flow passage 304 connecting together upper end portions of the respective left and right vertical flow passages 303a and 303b.

The horizontal flow passage 304 has a measurement flow passage housing block 305 that has an open top and that assumes a rectangular shape; namely, an oblong cross sectional profile. Transceiver mount blocks 306 are formed on positions of mutually-opposing walls close to short sides, thereby making up an ultrasonic measurement block 307.

A multilayered flow passage member 308 that partitions fluid into a plurality of flat flow passages is housed in the measurement flow passage housing block 305. The open top is sealed by a cover 309.

Circular through holes 306a are provided in the transceiver mount blocks 306 positioned on the walls close to the short sides in the measurement flow passage housing block 305, whereby an ultrasonic wave propagation path 306b is formed so as to cross the flowing fluid at an angle. A layout pattern in which such an ultrasonic wave propagation path 306b is set at an angle with respect to a flow is a so-called Z path (Z-path) or called a Z technique.

Figure 18:
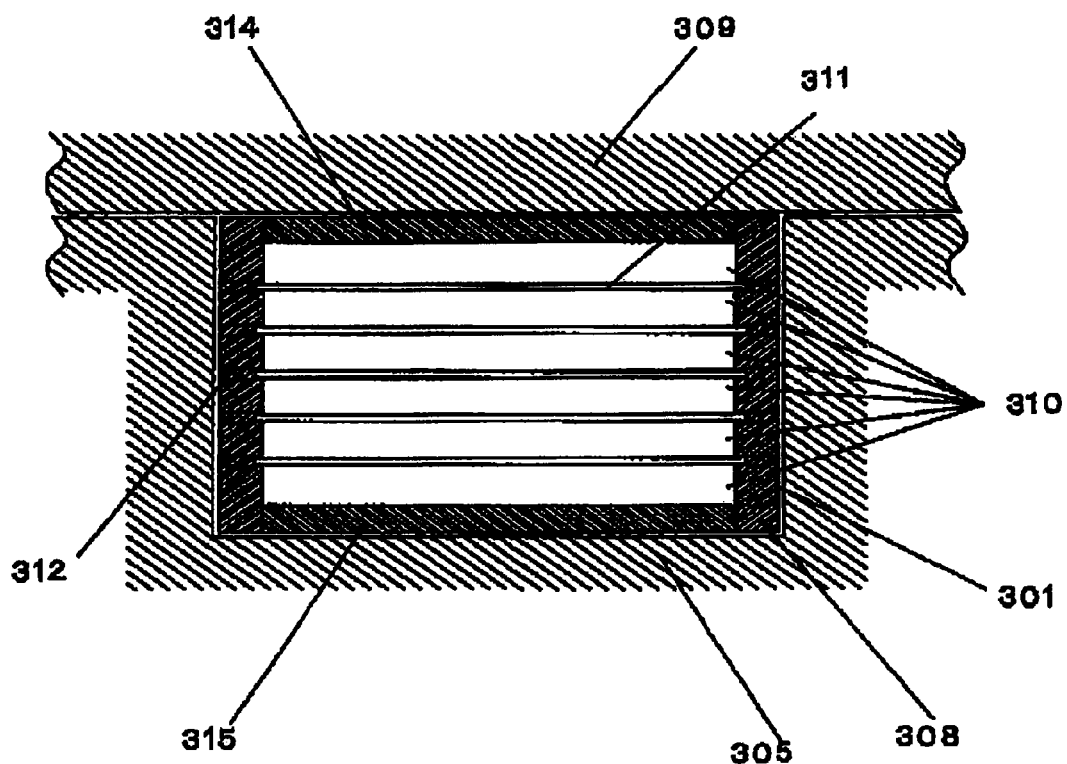
FIG. 18 is a cross sectional view of a multilayered flow passage member of the ultrasonic fluid measurement apparatus.
Figure 19:
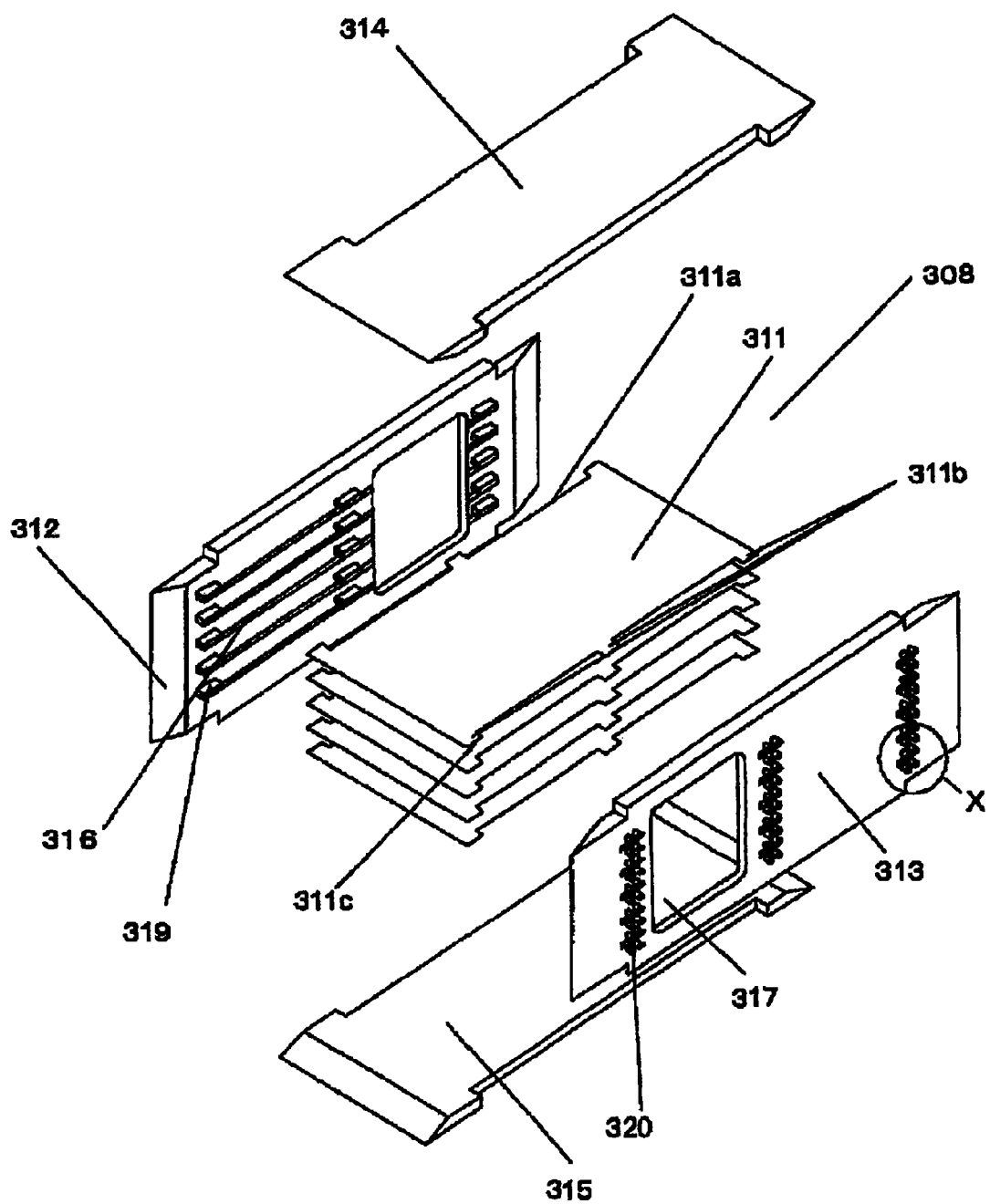
FIG. 19 is an exploded perspective view of the multilayered flow passage member.
Figure 20:
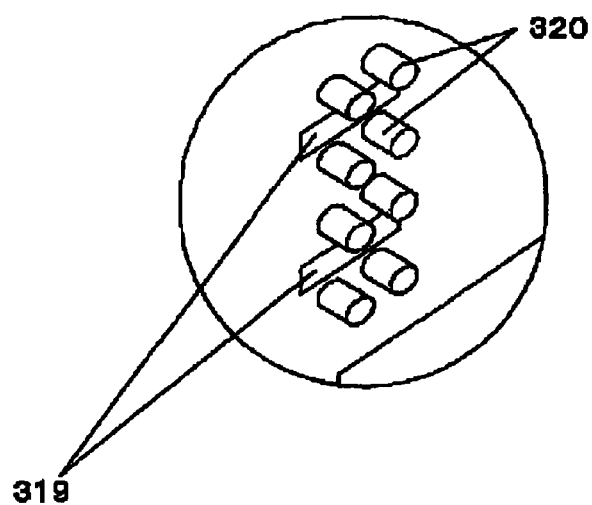
FIG. 20 is an enlarged perspective view of an area X in FIG. 19.

As shown in FIGS. 18 to 20, the multilayered flow passage member 308 is built, into the shape of a rectangular box, from partition plates 311 made of thin-plate-shaped members for partitioning a measurement flow passage into a plurality of flat flow passages 310, side plates 312 and 313 that support edges 311a of the respective partition plates 311 extending along a direction of flow of a fluid, and a top plate 314 and a bottom plate 315 placed on the side plates 312 and 313 in its vertical direction.

The partition plates 311 are horizontally held at a predetermined interval by the left and right side plates 312 and 313.

Specifically, a plurality of slits 316 for holding the partition plates 311 at a predetermined interval are laid on respective interior surfaces of the side plates 312 and 313. The slits 316 are provided at a uniform interval in the vertical direction orthogonal to the flow of a fluid in such a way that the flat flow passages 310 partitioned by the partition plates 311 each assume a uniform cross sectional area.

An ultrasonic wave passage opening 317 is formed in each of the side plates 312 and 313 of the multilayered flow passage member 308 in correspondence with the ultrasonic wave propagation path 306b.

Each of the openings 317 is equipped with a filtering member 318 that allows passage of an ultrasonic wave; for instance, fine perforated mesh metal, or the like.

Projections 311b are provided on front, back, and center portions on each of the edges 311a of the respective partition plates 311, so as to protrude outside in a widthwise direction.

In the meantime, insert holes 319 are formed at positions, which correspond to the respective projections 311b, in the respective slits 316 provided on the respective side plates 312 and 313. End faces 311c of the respective projections 311b come outside through the corresponding insert holes 319.

Fusible projections 320 are provided integrally on positions above and below each of the insert holes 319 of the side plates 312 and 313.

The projections 311b of the partition plates 311 are inserted into the respective insert holes 319 of the side plates 312 and 313. Further, a positioning jig for limiting clearance between the partition plates 311 and clearance between the partition plates 311, the top plate 314, and the bottom plate 315 is inserted into the partition plates. The fusible projections 320 are fused in this state, whereby the partition plates 311 are fixed to the side plates 312 and 313 through fusing.

Figure 21:
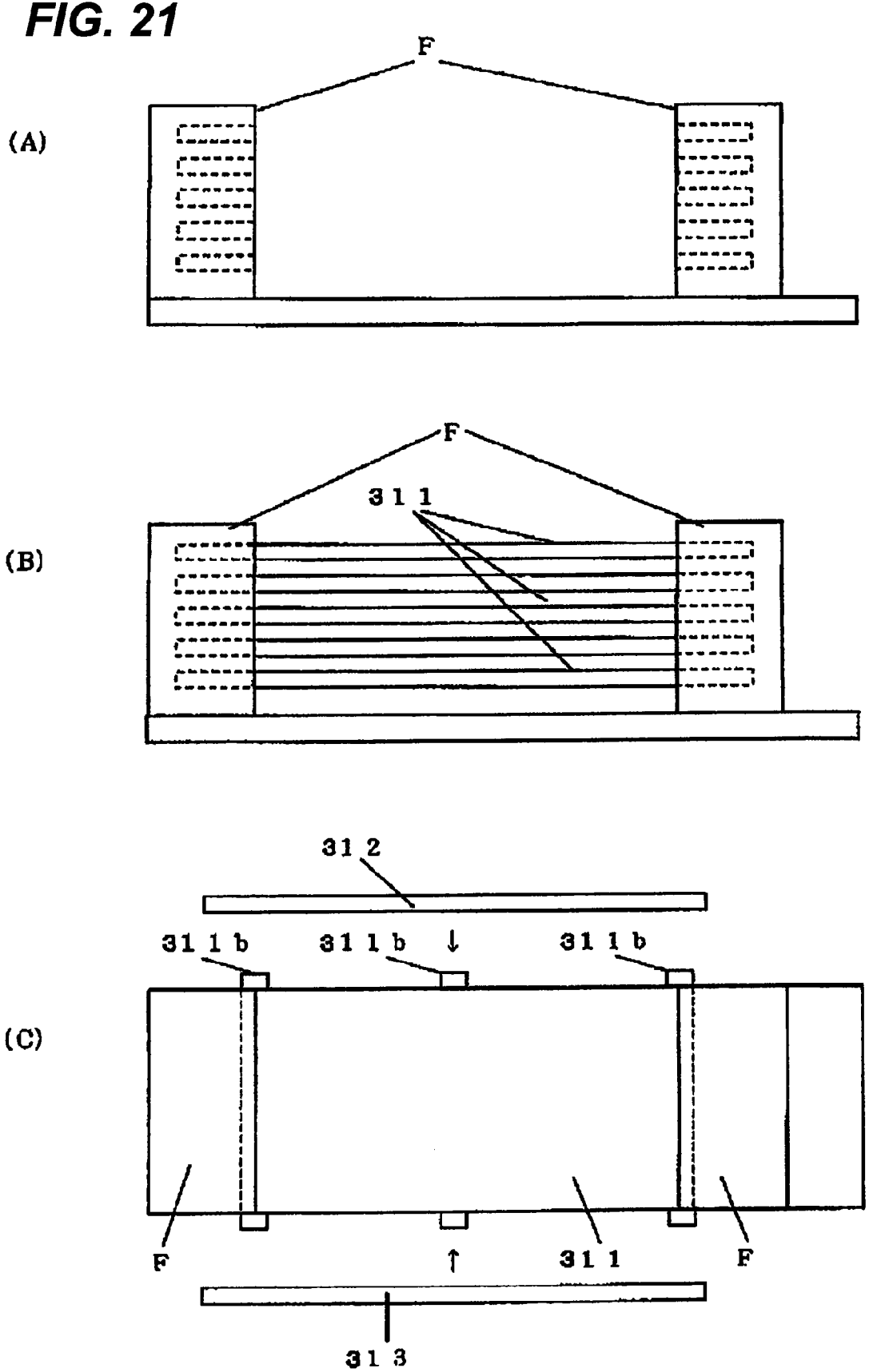
FIGS. 21(A), (B), and (C) are descriptive views showing a step of manufacturing the multilayered flow passage member.

As shown in FIG. 21, the partition plates 311 are first set at a desired interval in the multilayered flow passage member 308 through the positioning jig F, and the pair of side plates 312 and 313 are arranged in such a way that the slits 316 oppose each other.

Figure 22:
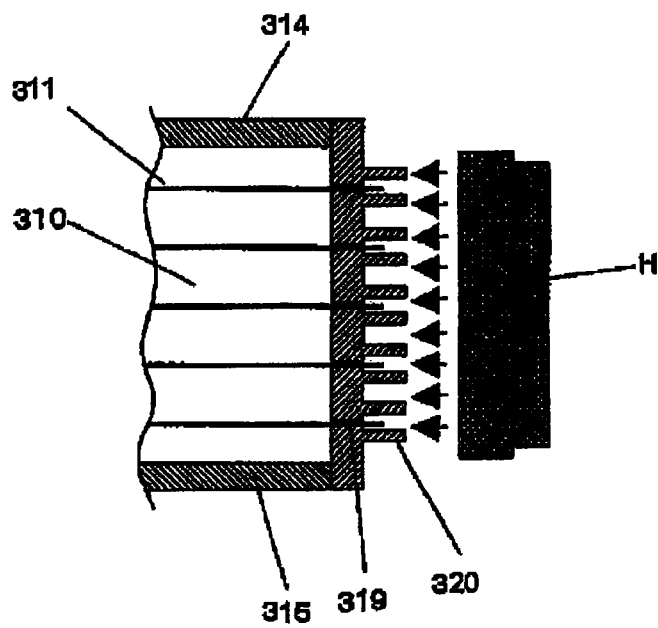
FIGS. 22(A) and (B) they are descriptive views showing a step of fusing the multilayered flow passage member.
FIG. 22(C) is an enlarged cross sectional view of the area X shown in FIG. 22(B).
Figure 22:
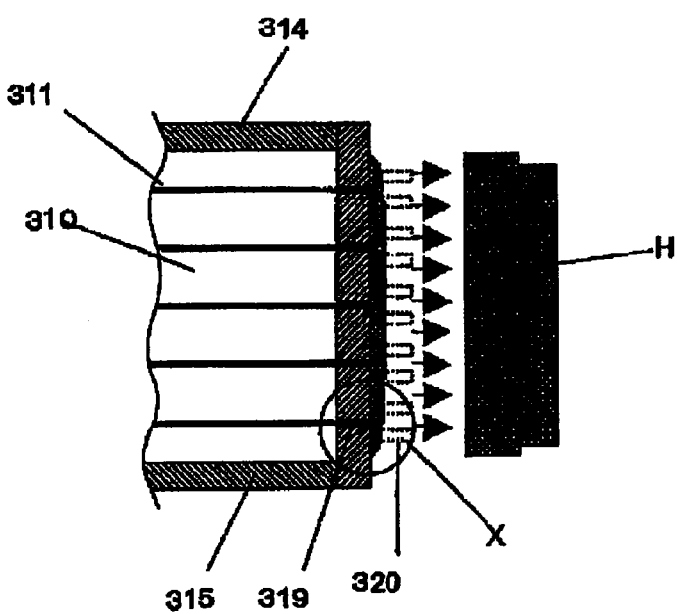
Figure 22:
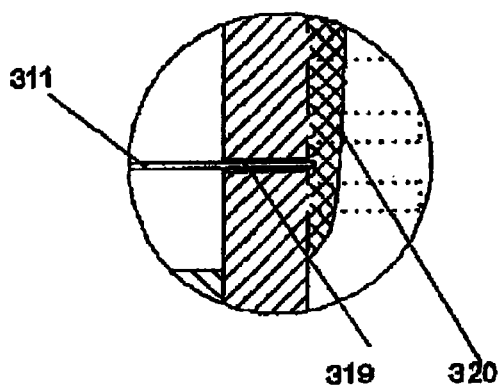
Figure 23:
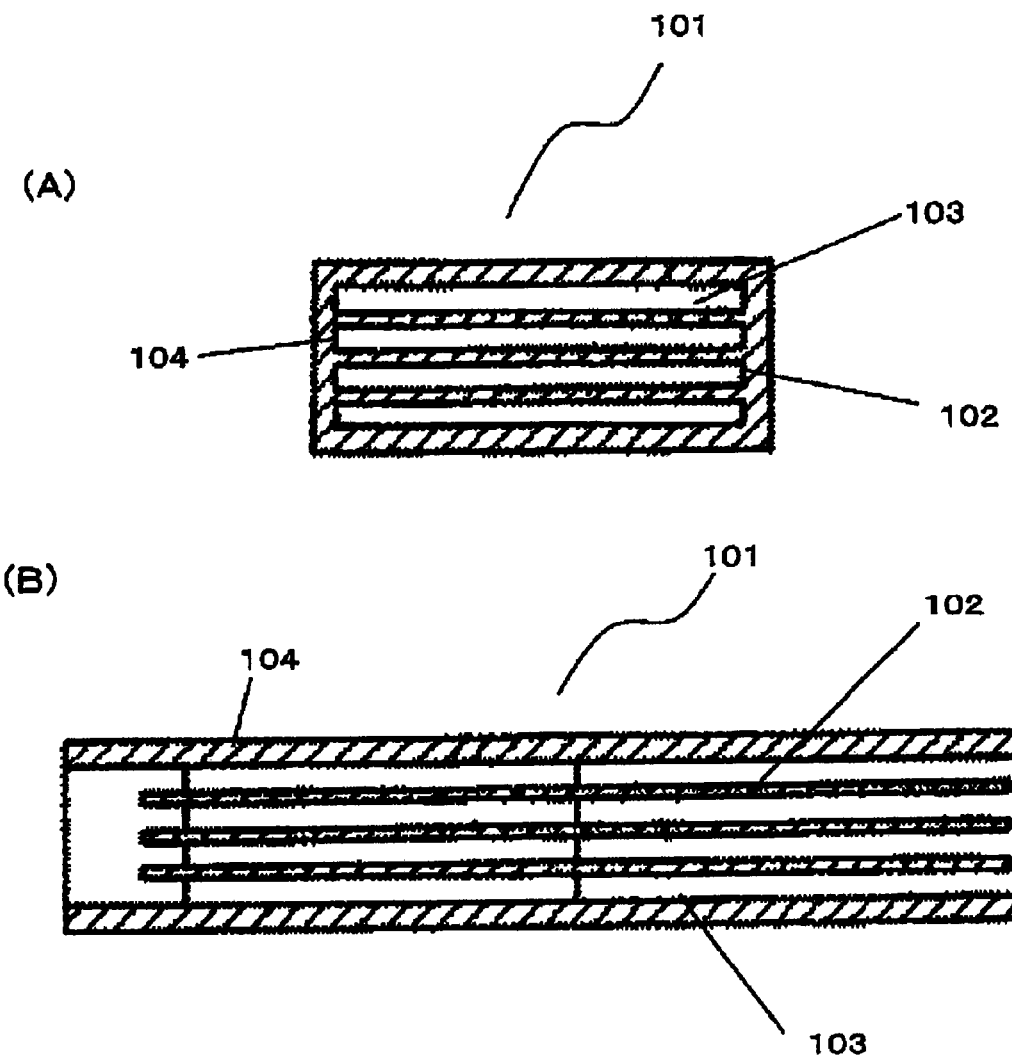
FIG. 23(A) is a front cross sectional view of a principal block of a related art ultrasonic fluid measurement apparatus.
FIG. 23(B) is a side cross sectional view.
Figure 24:
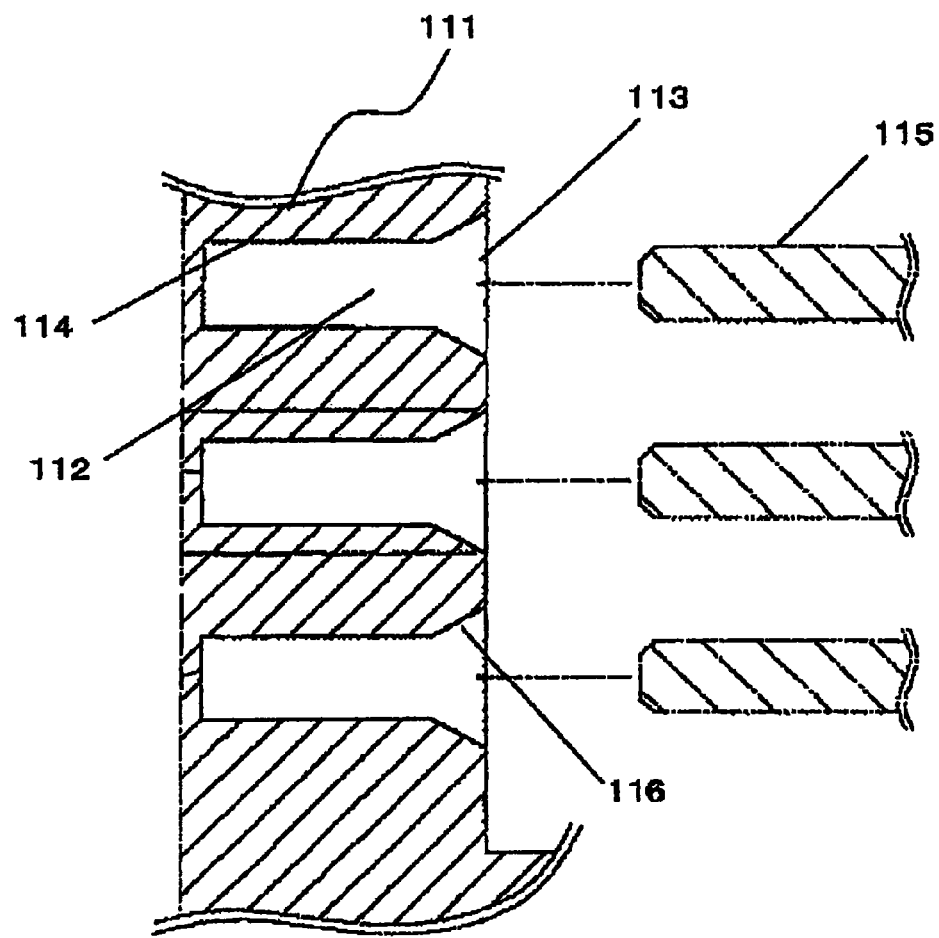
FIG. 24 is a cross sectional view of a principal block showing another modification of the related art ultrasonic fluid measurement apparatus.

As shown in FIG. 22(A), the edges 311a of the respective partition plates 311 are inserted into the respective slits 316 of the mutually-opposed side plates 312 and 313, and the projections 311b of the partition plates are caused to penetrate through the respective insert holes 319.

So long as the projections 311b are given a tapered shape, operation for letting the projections pass through the respective insert holes 319 is facilitated.

Subsequently, as shown in FIGS. 22(B) and (C), a heating head H is pressed against the side plates 312 and 313 in a sideway direction, to thus fuse the fusible projections 320.

Consequently, the fusible projections 320 and the projections 311b of the respective partition plates 311 are fused. When they are cooled and set, the side plates 312 and 313 and the respective partition plates 311 are integrated together.

A fused substance enters the respective insert holes 319, as well, thereby also filling clearance between the insert holes and the respective projections 311b.

Finally, the top plate 314 and the bottom plate 315 are attached to the top and bottom end faces of the side plates 312 and 313, thereby completing the multilayered flow passage member 308.

The top plate 314 and the bottom plate 315 can be fixed by use of an adhesive, or the like. However, it is also possible to provide top and bottom end faces of the side plates 312 and 313, the top plate 314, and the bottom plate 315 with fitting portions and to simultaneously fuse portions of the fitting portions by the heating head H when the fusible projections 320 are fused to areas above and below the respective insert holes 319 while the top and bottom plates remain fitted into the fitting portions.

As mentioned above, the partition plates 311 are inserted into the side plates 312 and 313 making up the multilayered flow passage member 308 for the ultrasonic fluid measurement apparatus 301. The fusible projections 320 are fused while the positioning jig for limiting the clearance between the partition plates 311 or clearance between the partition plates 311 and interior walls of the measurement flow passage (i.e., the top plate 314 and the bottom plate 315) is inserted in the partition plates. The partition plates 311 can be fastened to the side plates 312 and 313 through fusing while the partition plates are held in a positioned state.

The interval between the partition plates 311 can thereby be held by a dimension of a highly accurate positioning jig. Therefore, a highly accurate multilayered flow passage member 308 can be formed in a simple configuration while operability, like ease of insertion, is maintained without involvement of an increase in strength and accuracy of the side plates 312 and 313 to which the partition plates 311 are attached and without use of another member for assuring dimensional accuracy.

The side plates 312 and 313 assume a thin, elongated shape and cannot help suffering warpage because of their structure. Fuse areas where the partition plates 311 are to be fused to the side plates 312 and 313 are provided at least three locations on either lateral side of the multilayered flow passage member 308; namely, a center and both ends of the lateral side, with respect to the longitudinal direction. Hence, the partition plates 311 can be fused with strength while occurrence of warpage in the side plates 312 and 313 is prevented.

When the side plates 312 and 313 include warpage, either longitudinal end of each of the side plates is fixed. The center of the side plate is then fixed, and the remaining longitudinal end of the same side plate is fixed. However, it cannot help but causing a tendency to raise dimensional limitations in the longitudinal direction.

By contrast, when both longitudinal ends of the warpage side plate are first fastened and when the center of the side plate is finally fastened, an uplift cannot help but become likely to arise in the center, which in turn causes an unused portion. For this reason, it becomes difficulty to attain dimensional accuracy, and also the side plates come to exhibit tension. Therefore, fixed portions become easy to come off.

For these reasons, a fusing sequence is arranged such that the center of the side plate is first fused and that both ends of the same are then fused. This makes it difficult to cause an uplift in the center of each of the side plates 312 and 313. Further, a dimensional variation occurring in the side plates in their longitudinal direction comes to one-half, which makes it possible to pursue enhanced dimensional accuracy.

The explanation has been given to the embodiment in which the positioning jig that limits clearance between the partition plates 311 inserted into the side plates 312 and 313 or clearance between the partition plates 311 and the interior walls of the measurement flow passages is positioned within the multilayered flow passage member 308. Alternatively, the fuse area can also be subjected to fusing while portions of the partition plates 311 projecting out of the respective positioning insert holes 319 into which the portions of the partition plates 311 are to be inserted are fixed to the outside of the multilayered flow passage member 308; for instance, a neighborhood of the fuse area where the partition plates 311 are to be fused to the side plates 312 and 313, by the positioning jig.

Since the positioning jig is situated outside the multilayered flow passage member 308 according to the foregoing configuration, removable attachment of the multilayered flow passage member to the positioning jig becomes easy, which in turn yields an advantage of enhancement of operability. The other portions of the multilayered flow passage member can also assume any configuration, so long as the configuration falls within a range where the objective of the present invention is accomplished.

The present patent application is based on Japanese Patent Application (JP-A-2008-283845) filed on Nov. 5, 2008, Japanese Patent Application (JP-A-2008-283846) filed on Nov. 5, 2008, and Japanese Patent Application (JP-A-2008-289540) filed on Nov. 12, 2008, the entire subject matters of which are incorporated herein by reference.

INDUSTRIAL APPLICABILITY

As mentioned above, the multilayered flow passage member of the present invention makes it possible to produce a highly accurate multilayered flow passage member in a simple structure and provide a highly reliable multilayered flow passage member and an ultrasonic fluid measurement apparatus using the multilayered flow passage member. Hence, the multilayered flow passage member can be applied to an application, like a gas meter.

The invention claimed is:

1. A multilayered flow passage member including partition plates that are placed in an angular-sleeve-shaped measurement flow passage formed in an ultrasonic fluid measurement apparatus and that partition the measurement flow passage into a plurality of flat flow passages; side plates that cross the partition plates at a right angle and that support both edges of the respective partition plates; and upper and lower plates that are placed in parallel top and bottom the partition plates and that are coupled with the side plates, to thus support both edges, the flow passage member comprising:
   a lopsided fuse part including
      insert holes through which portions of the partition plates are to be inserted into the side plates; and
      fusible projections provided above and below the respective insert holes, wherein
   the fusible projections are fused by a fusing device while the partition plates are inserted into the respective side plates, thereby fixing the partition plates to the respective side plates, and wherein
   a fused state produced by the fusing device is caused to change according to either side of each of the partition plates, in such a way that clearance between the insert holes and the respective partition plates is formed in a given direction.

2. The multilayered flow passage member according to claim 1, wherein the a lopsided fuse part is arranged so as to form clearance between the insert holes and the respective partition plates in a given direction, by sloping in a vertical direction a fuse surface at a leading end of each of the fusible projections provided above and below the respective insert holes through which the portions of the partition plates are to be inserted into the respective side plates, in such a way that a fused state changes according to either side of each of the partition plates when the fusible projections are fused by the fusing device.

3. The multilayered flow passage member according to claim 1, wherein the a lopsided fuse part is arranged so as to form clearance between the insert holes and the respective partition plates in a given direction, by changing shape or number of the fusible projections provided above and below the respective insert holes into which the portions of the partition plates are to be inserted, in such a way that the fusible projections provided above and below the respective insert holes through which the portions of the partition plates are to be inserted into the side plates become fused in different quantity according to either side of each of the partition plates.

4. A multilayered flow passage member comprising:
   partition plates that create partitions for a plurality of flat flow passages;
   side plates that cross the respective partition plates at a right angle and that support both ends of the respective partition plates;
   a top plate and a bottom plate that are disposed in parallel top and bottom the partition plates and that are coupled with the respective side plates, to thus support both edges;
   support portions that are to be supported by the side plates and that are formed in portions of both edges of the respective partition plates; and
   insert holes through which the support portions are to be inserted into the respective side plates, wherein
   each of the insert holes includes an insert portion that assumes a shape of an aperture and that is greater than the support portion so as to facilitate insertion of the support portion and a stationary portion that is provided adjacently to the insert portion within a plane orthogonal to a direction into which the support portion is inserted into the insert portion, that has a part substantially identical in shape with a cross sectional profile of the support portion, and that makes the support portion stationary.

5. The multilayered flow passage member according to claim 4, wherein the insert portion is set to space that is greater than a width and thickness of the support portion, and the stationary portion is set to space that is substantially identical with a thickness of the support portion.

6. The multilayered flow passage member according to claim 4, wherein the stationary portion is formed at either an upper or lower position in each of the insert portions.

7. The multilayered flow passage member according to claim 4, wherein a closure device closes clearance that develops in the respective insert portions in a state where the partition plates are fixed in the respective side plates as a result of the support portions being slid to the respective stationary portions after having been inserted into the respective insert portions.

8. The multilayered flow passage member according to claim 7, wherein the closure device are formed integrally on either the top plate or the bottom plate or on both of them.

9. A multilayered flow passage member comprising:
   partition plates that partition a measurement flow passage into a plurality of flat flow passages;
   side plates that cross the respective partition plates at a right angle and that support both ends of the respective partition plates;
   a top plate and a bottom plate that are disposed in parallel, top and bottom the partition plates;
   insert holes provided in the side plates to permit insertion of portions of the partition plates; and
   fusible projections positioned above and below the respective insert holes, wherein the partition plates are fused to the respective side plates by fusing the fusible projections while the portions of the partition plates remain inserted into the respective insert holes.

10. The multilayered flow passage member according to claim 9, wherein fuse portions used for fusing the partition plates to the respective side plates are provided at three positions of the side plate in its longitudinal direction; namely, a center and both ends, and wherein the center is first fused, and both ends are subsequently fused.

11. An ultrasonic fluid measurement apparatus using the multilayered flow passage member defined in claim 1.

12. An ultrasonic fluid measurement apparatus using the multilayered flow passage member defined in claim 4.

13. An ultrasonic fluid measurement apparatus using the multilayered flow passage member defined in claim 9.

* * * * *